US012136079B2

(12) United States Patent
Jones et al.

(10) Patent No.: US 12,136,079 B2
(45) Date of Patent: Nov. 5, 2024

(54) REAL-TIME PROVISIONING OF TARGETED RECOMMENDATIONS BASED ON DECOMPOSED STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

(*) Notice: Subject to any disclaimer, the term of this patent is extended or adjusted under 35 U.S.C. 154(b) by 41 days.

(21) Appl. No.: 17/549,701

(22) Filed: Dec. 13, 2021

(65) Prior Publication Data

US 2022/0198427 A1 Jun. 23, 2022

Related U.S. Application Data

(60) Provisional application No. 63/126,739, filed on Dec. 17, 2020.

(51) Int. Cl.
*G06Q 30/00* (2023.01)
*G06Q 20/26* (2012.01)
(52) U.S. Cl.
CPC .................................. *G06Q 20/26* (2013.01)
(58) Field of Classification Search
CPC ..................................................... G06Q 20/26
(Continued)

(56) References Cited

U.S. PATENT DOCUMENTS 6,029,150 A 2/2000 Kravitz
7,184,989 B2 2/2007 Hansen et al.
(Continued)

FOREIGN PATENT DOCUMENTS

AU 2013206122 7/2014
CA 301 4693 2/2020
(Continued)

OTHER PUBLICATIONS

ProQuestDialogNPL Search History.*
(Continued)

*Primary Examiner* — John H. Holly
(74) *Attorney, Agent, or Firm* — Duane Morris LLP

(57) ABSTRACT

The disclosed embodiments include computer-implemented apparatuses and processes that provision, in real-time, targeted recommendations based on decomposed structured messaging data. For example, an apparatus receives a message that includes elements of message data disposed within corresponding message fields. The message data may characterizes a real-time payment requested by a first counterparty from a second counterparty and associated with a first product provisioned to the second counterparty by the first counterparty. Based on elements of message data, the apparatus determines a value of a parameter that characterizes at least one of the second counterparty or a relationship between the second counterparty and the first counterparty, and transmits digital content associated with the parameter value to a device operable by the second counterparty, which presents a portion of the digital content within a digital interface.

22 Claims, 8 Drawing Sheets

(58) Field of Classification Search
USPC ............... 705/39, 1.1, 26.3, 21, 14.12, 7.15;
370/252, 315, 254; 455/436, 437
See application file for complete search history.

(56) References Cited

U.S. PATENT DOCUMENTS

| | | | |
|---|---|---|---|
| 7,366,694 B2 | 4/2008 | Lazerson | |
| 7,487,112 B2 | 2/2009 | Barnes, Jr. | |
| 7,555,459 B2 | 6/2009 | Dhar et al. | |
| 7,593,889 B2 | 9/2009 | Raines et al. | |
| 7,624,070 B2 | 11/2009 | Lebouitz | |
| 7,630,933 B2 | 12/2009 | Peterson et al. | |
| 7,653,592 B1 | 1/2010 | Flaxman et al. | |
| 7,676,425 B1 | 3/2010 | Noles | |
| 7,676,431 B2 | 3/2010 | O'Leary et al. | |
| 7,680,737 B2 | 3/2010 | Smith, Jr. et al. | |
| 7,693,790 B2 | 4/2010 | Lawlor et al. | |
| 7,707,055 B2 | 4/2010 | Behmoiras et al. | |
| 7,707,107 B2 | 4/2010 | Gebb et al. | |
| 7,801,778 B2 | 9/2010 | Fox | |
| 7,809,633 B2 | 10/2010 | Nolan, III et al. | |
| 7,813,965 B1 | 10/2010 | Robinson et al. | |
| 7,827,052 B2 | 11/2010 | Scott et al. | |
| 7,844,546 B2 | 11/2010 | Fleishman et al. | |
| 7,849,003 B2 | 12/2010 | Egnatios et al. | |
| 7,873,543 B2 | 1/2011 | Ferrier et al. | |
| 7,899,712 B2 | 3/2011 | May et al. | |
| 7,904,306 B2 | 3/2011 | Johnson et al. | |
| 7,912,784 B2 | 3/2011 | Sobek | |
| 7,970,669 B1 | 6/2011 | Santos | |
| 8,156,022 B2 | 4/2012 | Fell et al. | |
| 8,249,983 B2 | 8/2012 | Dilip et al. | |
| 8,423,403 B2 | 4/2013 | McClung | |
| 8,433,648 B2 | 4/2013 | Keithley et al. | |
| 8,600,798 B1 | 12/2013 | Corr et al. | |
| 8,606,705 B2 | 12/2013 | Zanzot et al. | |
| 8,612,339 B2 | 12/2013 | Rose et al. | |
| 8,615,426 B2 | 12/2013 | Carlson | |
| 8,639,910 B2 | 1/2014 | Karamcheti et al. | |
| 8,666,812 B1 | 3/2014 | Gandhi | |
| 8,700,484 B2 | 4/2014 | Senior | |
| 8,712,912 B2 | 4/2014 | Carlson et al. | |
| 8,719,071 B2 | 5/2014 | Macintyre et al. | |
| 8,732,044 B2 | 5/2014 | Lovelett et al. | |
| 8,744,899 B2 | 6/2014 | Rose et al. | |
| 8,751,387 B2 | 6/2014 | Hougland et al. | |
| 8,756,099 B1 | 6/2014 | Keithley et al. | |
| 8,788,416 B1 | 7/2014 | Vu | |
| 8,799,150 B2 | 8/2014 | Annappindi | |
| 8,814,039 B2 | 8/2014 | Bishop et al. | |
| 9,094,512 B2 | 7/2015 | Sheldon et al. | |
| 9,218,618 B2 | 12/2015 | Walker et al. | |
| 9,390,410 B2 | 7/2016 | Casares | |
| 9,412,118 B2 | 8/2016 | Loomis | |
| 9,563,915 B2 | 2/2017 | Brady et al. | |
| 9,600,839 B2 | 3/2017 | Calman et al. | |
| 9,792,600 B1 | 10/2017 | Grassadonia | |
| 9,799,026 B1 | 10/2017 | Allen et al. | |
| 9,875,385 B1 | 1/2018 | Humphreys et al. | |
| 9,922,324 B2 | 3/2018 | Wilson et al. | |
| 9,996,616 B2 | 6/2018 | Grant et al. | |
| 10,108,959 B2 | 10/2018 | Wolfs et al. | |
| 10,185,936 B2 | 1/2019 | Praisner et al. | |
| 10,282,715 B2 | 5/2019 | Brennan et al. | |
| 10,290,016 B1 | 5/2019 | Rose | |
| 10,354,267 B2* | 7/2019 | Carlson | G06Q 30/0244 |
| 10,387,881 B2 | 8/2019 | Studnitzer | |
| 10,453,062 B2 | 10/2019 | Wolfs et al. | |
| 10,529,016 B2 | 1/2020 | Abela et al. | |
| 10,535,054 B1 | 1/2020 | Spitzer | |
| 10,552,807 B2 | 2/2020 | Marcous et al. | |
| 10,558,962 B2 | 2/2020 | Szeto | |
| 10,565,630 B2 | 2/2020 | Haceaturean et al. | |
| 10,586,236 B2 | 3/2020 | Pourfallah et al. | |
| 10,607,284 B2 | 3/2020 | Loganathan et al. | |
| 10,643,277 B2 | 5/2020 | Berta et al. | |
| 10,679,285 B1 | 6/2020 | Kurani et al. | |
| 10,699,289 B1 | 6/2020 | Dalton et al. | |
| 10,733,623 B2 | 8/2020 | Ovick et al. | |
| 10,740,843 B2 | 8/2020 | Shakkarwar | |
| 10,743,149 B2 | 8/2020 | Sewell | |
| 10,771,413 B1 | 9/2020 | Heffron | |
| 10,776,751 B2 | 9/2020 | Chin | |
| 10,783,510 B2* | 9/2020 | George | G06Q 20/102 |
| 10,789,580 B2 | 9/2020 | Wolfs et al. | |
| 10,789,641 B2 | 9/2020 | Lesandro et al. | |
| 10,909,508 B2 | 2/2021 | Fineman et al. | |
| 11,468,443 B2 | 10/2022 | Jones et al. | |
| 11,727,430 B2 | 8/2023 | Mitchell | |
| 11,907,945 B2 | 2/2024 | Jones et al. | |
| 2002/0111915 A1 | 8/2002 | Clemens et al. | |
| 2004/0138999 A1 | 7/2004 | Friedman et al. | |
| 2004/0220873 A1 | 11/2004 | Nolan, III et al. | |
| 2005/0004868 A1 | 1/2005 | Klatt et al. | |
| 2006/0143124 A1 | 6/2006 | Ehrke | |
| 2007/0198407 A1 | 8/2007 | Winter | |
| 2007/0265946 A1 | 11/2007 | Schimpf et al. | |
| 2007/0288312 A1 | 12/2007 | Wang | |
| 2008/0270246 A1 | 10/2008 | Chen | |
| 2009/0132410 A1 | 5/2009 | Penney et al. | |
| 2009/0164627 A1 | 6/2009 | Bishop et al. | |
| 2009/0271224 A1 | 10/2009 | Lange | |
| 2010/0057606 A1 | 3/2010 | Louie | |
| 2010/0057610 A1 | 3/2010 | Pinkerton | |
| 2010/0211499 A1 | 8/2010 | Zanzot et al. | |
| 2010/0250407 A1 | 9/2010 | Silva | |
| 2011/0099067 A1 | 5/2011 | Cooper et al. | |
| 2011/0191173 A1 | 8/2011 | Blackhurst | |
| 2012/0036013 A1 | 2/2012 | Neuhaus | |
| 2012/0284130 A1 | 11/2012 | Lewis et al. | |
| 2013/0066800 A1 | 3/2013 | Falcone et al. | |
| 2013/0073386 A1 | 3/2013 | Rose et al. | |
| 2013/0073445 A1 | 3/2013 | Meszaros | |
| 2013/0138563 A1 | 5/2013 | Gilder et al. | |
| 2013/0226789 A1 | 8/2013 | Orttung et al. | |
| 2013/0246220 A1 | 9/2013 | Hammad et al. | |
| 2014/0025467 A1 | 1/2014 | Nagarahan et al. | |
| 2014/0067677 A1 | 3/2014 | Ali et al. | |
| 2014/0074688 A1 | 3/2014 | Shvarts | |
| 2014/0095638 A1 | 4/2014 | Chen | |
| 2014/0122331 A1 | 5/2014 | Vaish et al. | |
| 2014/0172687 A1 | 6/2014 | Chirehdast | |
| 2014/0236695 A1 | 8/2014 | Shvarts et al. | |
| 2014/0279444 A1 | 9/2014 | Kassemi et al. | |
| 2014/0279513 A1 | 9/2014 | Dodds-Brown et al. | |
| 2014/0310151 A1 | 10/2014 | Shishkov et al. | |
| 2015/0032525 A1 | 1/2015 | Blackhurst et al. | |
| 2015/0032538 A1 | 1/2015 | Calman et al. | |
| 2015/0046201 A1 | 2/2015 | Miller et al. | |
| 2015/0073902 A1 | 3/2015 | Soni | |
| 2015/0100416 A1 | 4/2015 | Blackhurst et al. | |
| 2015/0100481 A1 | 4/2015 | Ghosh et al. | |
| 2015/0112854 A1 | 4/2015 | Guriel et al. | |
| 2015/0170175 A1 | 6/2015 | Zhang et al. | |
| 2015/0193873 A1 | 7/2015 | Hammock et al. | |
| 2015/0228031 A1 | 8/2015 | Emison et al. | |
| 2015/0310490 A1 | 10/2015 | Meredith et al. | |
| 2015/0363762 A1 | 12/2015 | Kimberg | |
| 2016/0034969 A1 | 2/2016 | Mazurov | |
| 2016/0104155 A1 | 4/2016 | McGaugh et al. | |
| 2016/0189292 A1 | 6/2016 | Deshpande et al. | |
| 2016/0196566 A1 | 7/2016 | Murali et al. | |
| 2016/0247177 A1 | 8/2016 | Zamer | |
| 2017/0004501 A1 | 1/2017 | Ledford et al. | |
| 2017/0161826 A1 | 6/2017 | Packer et al. | |
| 2017/0169511 A1 | 6/2017 | Kelly | |
| 2017/0193501 A1 | 7/2017 | Cole et al. | |
| 2017/0221066 A1 | 8/2017 | Ledford et al. | |
| 2017/0270493 A1 | 9/2017 | Lugli et al. | |
| 2017/0364878 A1 | 12/2017 | Malhotra et al. | |
| 2018/0018661 A1 | 1/2018 | Wade | |
| 2018/0096335 A1 | 4/2018 | Moghaizel et al. | |
| 2018/0097901 A1 | 4/2018 | Ramachanda | |
| 2018/0174116 A1 | 6/2018 | Maenpaa | |

(56) References Cited

U.S. PATENT DOCUMENTS

| | | |
|---|---|---|
| 2018/0181928 A1 | 6/2018 | Woo |
| 2018/0330354 A1 | 11/2018 | Xiu et al. |
| 2019/0012645 A1 | 1/2019 | Subramaniam et al. |
| 2019/0043052 A1 | 2/2019 | Ledford et al. |
| 2019/0109915 A1 | 4/2019 | McPhee et al. |
| 2019/0114598 A1 | 4/2019 | Subramaniam et al. |
| 2019/0114666 A1 | 4/2019 | Kohli |
| 2019/0340590 A1 | 11/2019 | Ledford et al. |
| 2019/0378182 A1 | 12/2019 | Weinflash et al. |
| 2020/0014642 A1 | 1/2020 | Sidi et al. |
| 2020/0034813 A1 | 1/2020 | Calinog et al. |
| 2020/0051117 A1 | 2/2020 | Mitchell |
| 2020/0074565 A1 | 3/2020 | Dotter |
| 2020/0104911 A1* | 4/2020 | Suvajac .................. G06N 3/04 |
| 2020/0160295 A1 | 5/2020 | Jagalpure et al. |
| 2020/0242600 A1 | 7/2020 | Stack et al. |
| 2020/0327529 A1 | 10/2020 | Mukherjee et al. |
| 2020/0349639 A1 | 11/2020 | Mousseau |
| 2020/0364760 A1 | 11/2020 | Sabat et al. |
| 2020/0364784 A1 | 11/2020 | Dill |
| 2020/0387878 A1 | 12/2020 | Jones et al. |
| 2021/0150624 A1 | 5/2021 | Tucker et al. |
| 2022/0044238 A1 | 2/2022 | Jones et al. |
| 2022/0076248 A1 | 3/2022 | Kapoor et al. |
| 2022/0198411 A1 | 6/2022 | Jones et al. |
| 2022/0198417 A1 | 6/2022 | Jones et al. |
| 2022/0198432 A1 | 6/2022 | Jones et al. |
| 2022/0198433 A1 | 6/2022 | Jones et al. |
| 2022/0198445 A1 | 6/2022 | Jones et al. |
| 2022/0198501 A1 | 6/2022 | Jones et al. |
| 2022/0198543 A1 | 6/2022 | Jones et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0414656 A1 | 12/2022 | Jones et al. |
| 2023/0055605 A1 | 2/2023 | Jones et al. |
| 2023/0056173 A1 | 2/2023 | Jones et al. |
| 2023/0056764 A1 | 2/2023 | Jones et al. |

FOREIGN PATENT DOCUMENTS

| | | |
|---|---|---|
| CN | 104321738 | 6/2018 |
| IN | 202011016562 | 6/2020 |
| KR | 20060003230 | 1/2006 |
| KR | 20170127418 | 11/2014 |
| KR | 20160140969 | 12/2016 |
| KR | 10-2073974 | 2/2020 |
| WO | WO 2001050370 | 7/2001 |
| WO | WO 2002069290 | 9/2002 |
| WO | WO 2003025712 | 3/2003 |
| WO | WO 2012151571 | 11/2012 |
| WO | WO 2013044286 | 4/2013 |
| WO | WO 2016190810 | 1/2016 |
| WO | WO 2019071263 | 4/2019 |

OTHER PUBLICATIONS

Quibria, "Introduction to ISO 20022 for U.S. Financial Institutions", NACHA—3 The Electronic Payments Association; 45 pgs. (2015).

Wandhofer et al., "The Future of Correspondent Banking Cross Border Payments", Swift Institute Working Paper No. Jan. 2017; 63 pgs. (2018).

Rogers, The Definitive Guide to eCommerce Product Reviews (2017).

Khanna, "Venmo'ed: Sharing Your Payment Data with the World," Technology Science, 2018102901, Oct. 28, 2015 (27 pages).

STIC Search Report, Sep. 17, 2023 (4 pages).

Lochy, "Big Data in the Financial Services Industry—From data to insights", Finextra, 12 pgs. (2019).

Cohen, et al., "Ride on! Mobility business models for the sharing economy," Organization & Environment, 27.3, 2014, pp. 279-296.

Fis, Flavors of Fast, Report; 59 pages (2019).

Infosys, "Global Trends in the Cards and Payments Industry", 40 pgs. (2020).

Sullivan, "Sick of Overdraft Fees? There's an App for that." 8 pgs. (2018).

"POS Financing: There's a Lending Marketplace for That," PYMINTS. com; 19 pgs., (2020).

Target is Live with Afterpay.com; 4 pgs., (2021).

"Klama's Marketing Strategy: The Unique Growth Story Behind The Brand," 14 pgs. (2021).

* cited by examiner

ND DESCRIPTION OF

REAL-TIME PROVISIONING OF TARGETED RECOMMENDATIONS BASED ON DECOMPOSED STRUCTURED MESSAGING DATA

CROSS-REFERENCE TO RELATED APPLICATION

This application claims the benefit of priority to U.S. Provisional Patent Application No. 63/126,739, filed on Dec. 17, 2020, the entire disclosure of which is expressly incorporated herein by reference to its entirety.

TECHNICAL FIELD

The disclosed embodiments generally relate to computer-implemented systems and processes that provision, in real-time, targeted recommendations based on decomposed structured messaging data.

BACKGROUND

The mass adoption of smart phones and digital payments within the global marketplace drives an increasingly rapid adoption of real-time payment (RTP) technologies by financial institutions, consumers, vendors and merchants, and other participants in the payment ecosystem. These RTP technologies often emphasize data, messaging, and global interoperability and in contrast to many payment rails, such as those that support credit card payments, embrace the near ubiquity of mobile technologies in daily life to provide, to the participants in the RTP ecosystem, real-time service and access to funds.

SUMMARY

In some examples, an apparatus includes a communications interface, a memory storing instructions, and at least one processor coupled to the communications interface and to the memory. The at least one processor is configured to execute the instructions to receive, via the communications interface, a message comprising elements of message data disposed within corresponding message fields. The message data characterizes a real-time payment requested by a first counterparty from a second counterparty, and the real-time payment is associated with a first product provisioned to the second counterparty by the first counterparty. The at least one processor is configured to execute the instructions to determine a value of a parameter that characterizes at least one of the second counterparty or a relationship between the second counterparty and the first counterparty, and obtain digital content associated with the parameter value. The at least one processor is configured to execute the instructions to transmit, via the communications interface, notification data that includes the digital content to a device operable by the second counterparty. The notification data causes an application program executed at the device to present a portion of the digital content within a digital interface.

In other examples, a computer-implemented method includes receiving, using at least one processor, a message comprising elements of message data disposed within corresponding message fields. The message data characterizes a real-time payment requested by a first counterparty from a second counterparty, and the real-time payment is associated with a first product provisioned to the second counterparty by the first counterparty. The method includes, based on the elements of message data, determining, using the at least one processor, a value of a parameter that characterize at least one of the second counterparty or a relationship between the second counterparty and the first counterparty, and obtaining, using the at least one processor, digital content associated with the parameter values. The method includes transmitting, using the at least one processor, notification data that includes the digital content to a device operable by the second counterparty. The notification data causes an application program executed at the device to present a portion of the digital content within a digital interface.

Additionally, in some examples, a tangible, non-transitory computer-readable medium stores instructions that, when executed by at least one processor, cause the at least one processor to perform a method that includes receiving a message comprising elements of message data disposed within corresponding message fields. The message data characterizes a real-time payment requested by a first counterparty from a second counterparty, and the real-time payment is associated with a product provisioned to the second counterparty by the first counterparty. The method includes, based on the elements of message data, determining a value of a parameter that characterize at least one of the second counterparty or a relationship between the second counterparty and the first counterparty, and obtaining digital content associated with the parameter values. The method includes transmitting notification data that includes the digital content to a device operable by the second counterparty. The notification data causes an application program executed at the device to present a portion of the digital content within a digital interface.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
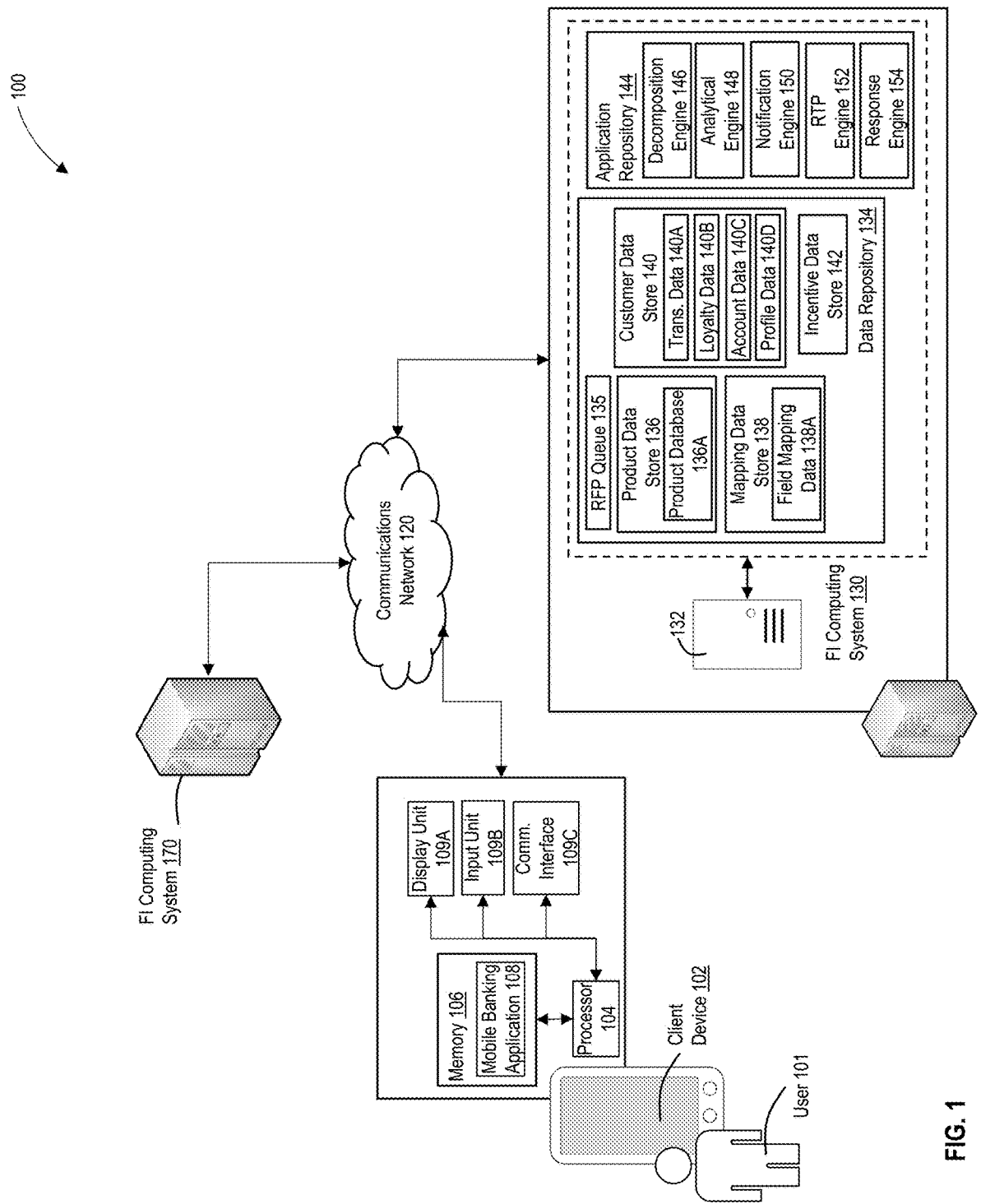
FIG. 1 is a block diagram of an exemplary computing environment, in accordance with some exemplary embodiments.

Today, the mass adoption of smart phones and digital payments within the global marketplace drives an adoption of real-time payment (RTP) technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a first financial institution may hold a loan product (e.g., a home mortgage, etc.) issued or serviced by a second financial institution that participates in the RTP ecosystem, and to request a scheduled monthly payment on that loan product (e.g., portions of which are directed to an escrow account and directed to pay down respective portions of a principal amount and accrued interest, etc.), a computing system of the second financial institution may generate a Request for Payment (RFP) message, and transmit that message to one or more computing systems of a financial institution of the customer, e.g., directly or through one or more intermediate systems associated with the RTP ecosystem, such as a clearinghouse system. The generated and transmitted RFP message may, for example, be formatted in accordance with the ISO 20022 data-exchange format, and may include message fields populated with information that includes, but is not limited to, information identifying the customer and the second financial institution, information characterizing the requested payment, such as a total payment amount, a requested payment date or a payment due date, the portions of the requested payment that are directed to the escrow account, that are directed to pay down the principal amount, or that are directed to pay off accrued interest, and information identifying the loan product, such as, but not limited to, a type of loan product (e.g., a home mortgage, etc.), a term, a fixed interest rate, a variable interest rate (and a scheduled reset date or scheduled reset dates), the principal amount of the loan product, and/or a payoff amount associated with the loan product. Further, the ISO-20022-compliant RFP message may also include a link within a structured or unstructured message field to information, such as remittance data, associated with the requested monthly payment (e.g., a link to a PDF or HTML bill or payment stub that includes any of the information described herein that identifies the financial institution requesting payment, the requesting payment, or the loan product).

In some examples, the elements of structured or unstructured data maintained within the message fields of exemplary, ISO-20022-compliant RFP messages described herein may extend beyond the often-limited content of the message data transmitted across many conventional payment rails and transaction processing networks. Further, when intercepted and decomposed by a computing system of the financial institution of the customer (e.g., an FI computing system), these elements of structured or unstructured RFP message data may be processed by the FI computing system to adaptively generate one or more elements of data (e.g., "characteristic" data) that characterize the customer, a current or time-evolving relationship between the customer and the first financial institution, and in some instances, a current or time-evolving relationship between the customer and the loan product issued by the second financial institution. FI computing system 130 may perform any of the exemplary processes described herein to identify one or more targeted incentives or offers that are consistent with all, or subset of, the elements of characteristic data, and to provision, to a device of the customer in real-time and contemporaneously with the receipt of the RFP message, elements of digital content of that offer the targeted offers and incentive to the customer, either alone or in conjunction with additional digital content identifying and characterizing the real-time payment requested by the second financial institution.

By way of example, and using any of the exemplary processes described herein, the FI computing system may provision, to the customer device, a payment notification that identifies and characterizes the real-time payment requested by the second financial institution, and one or more incentive notifications that identify corresponding ones of the targeted offers and incentives, and in some instances, one or more terms and conditions associated with the targeted offers or incentives. As described herein, one or more of the targeted offers or incentives may be associated with a product or service available for provision to the customer by the first financial institution, or a product or service available for provisioning to the customer by a third-party having a relationship with the first financial institution, and in some instances, an application program executed by the customer device may perform operations, described herein, that render the payment notification for presentation with a portion of a digital interface and to render of one or more of the incentives notifications for presentation within an additional portion of the digital interface, e.g., concurrently with the presentation of the payment notification.

Upon presentation within the additional portion of a digital interface of the customer device, the one or more incentive notifications that identify the corresponding one of the targeted offers and incentives, and the associated terms and conditions, may prompt the customer to accept, or alternatively reject, the targeted offer or incentive in real-time and contemporaneously with an approval or rejection of the payment requested by the second financial institution. Further, and based on confirmation data indicative of the customer acceptance of one or more of the targeted offers or incentives, the FI computing system may perform any of the exemplary processes described herein to provision the product or service associated with the each of the accepted offers or incentives to the customer in accordance with the associated terms and conditions. The FI computing system may also perform any of the exemplary processes described herein to generate an additional, ISO-2002-compliant RTP message, when provisioned to one or more computing systems of the second financial institution, provides the requested payment to the second financial institution, e.g., in real-time and contemporaneously with the receipt of the RFP message.

Certain of the exemplary processes described herein, which decompose the structured message fields of an ISO-20022-compliant RFP message to obtained elements of decomposed message data characterizing the customer, the merchant, the loan product issued by the second financial institution, and the requested, real-time payment, which analyze the elements of decomposed message data to determine adaptively characteristic values associated with the customer and the customer's relationship with the first financial institution or the loan product issued by the financial institution, and which provision data identifying targeted offers or incentives that are consistent with the adaptively determined characteristic values to the presentation within a digital interface in real-time and contemporaneously with the real-time payment requested by the second financial institution, may be implemented in addition to, or as an alternate to, many processes that relay on the often-limited content of temporally delayed message data transmitted across many existing payment rails and transaction processing networks.

A. Exemplary Computing Environments

FIG. 1 is a diagram illustrating an exemplary computing environment 100 that includes, among other things, one or more computing devices, such as a client device 102, and one or more computing systems, such as a financial institution (FI) computing systems 130 and 170, which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 106, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.) and additionally or alternatively, executable applications associated with the first financial institution associated with FI computing system 130, such as mobile banking application 108.

In some instances, not illustrated in FIG. 1, memory 106 may also include one or more structured or unstructured data repositories or databases, and client device 102 may maintain one or more elements of device data and location data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102. Further, the elements of location data may include data that identifies geographic locations of client device 102 at corresponding times or dates.

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

In some instances, each of FI computing system 130 and FI computing system 170 may represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. Further, each of FI computing systems 130 and 170 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 1). In some instances, FI computing system 130 and/or FI computing system may correspond to a discrete computing system, although in other instances, FI computing system 170 or FI computing system 130 may correspond to a distributed computing system having multiple, computing components distributed across an appropriate computing network, such as communications network 120 of FIG. 1A, or those established and maintained by one or more cloud-based providers, such as Microsoft Azure™, Amazon Web Services™, or another third-party, cloud-services provider.

By way of example, FI computing system 130 may be associated with, or operated by, a first financial institution that offers financial products or services to one or more customers, such as, but not limited to, user 101 that operates client device 102. The financial products or services may, for example, include payment instruments issued by the first financial institution to user 101, and available to fund payment or purchase transactions, such as the exemplary real-time payment transactions described herein. Examples of the payment instruments may include, but are not limited to, a credit card, checking, savings, or any other suitable deposit account. Further, the financial products or services may further include one or more loan products, such as secured or unsecured lines-of-credit, home mortgages, auto loans, unsecured personal loans, home-equity lines-of-credit (HELOCs), or additional, or alternate, loan products available to finance purchases of goods or services by user 101, or to refinance existing loan products held by user 101. In some instances, FI computing system 130 may exchange data programmatically with one or more application programs executed at client device 102, such as mobile banking application 108.

Further, and as described herein, FI computing system 170 may be associated with, or operated by, a second financial institution, and may maintain issued one or more loan products, such as those described herein, to corresponding customers, such as, but not limited to, user 101. For example, the second financial institution may issue a loan product, such as a home mortgage, to user 101, and the issued home mortgage may be associated with a minimum monthly payment and corresponding due dates consistent with a determined repayment schedule. In some instances, FI computing system 170 may perform operations that, in accordance with the determined repayment schedule, generate elements of messaging data that request a scheduled monthly payment on or before the corresponding due date. As described herein, the one or more elements of messaging data may be packaged into a Request for Payment (RFP) massage formatted and structured in accordance with one or more standardized data-exchange protocols, such as the ISO 20022 standard for electronic data exchange between financial institutions, and the RFP message may request, from user 101, at least a minimum monthly payment in real-time and prior to the corresponding due date. FI computing system 170 may, for example, transmit the generated RFP message across a corresponding communications network, such as network 120, to FI computing system 130, either directly or through one or more intermediate computing systems, such as a computing system operated by a clearinghouse associated with the RTP ecosystem.

In some instances, FI computing system 130 may receive (e.g., intercept) the RFP message associated with the real-time payment requested by the second financial institution from user 101, and FI computing system 130 may perform any of the exemplary processes described herein to obtain elements of structured or unstructured RFP message data from the message fields of the RFP message that identify and characterize, among other things, user 101, the requested payment, the second financial institution, and the loan product issued by that second financial institution (e.g., to "decompose" the RFP message data). Based on the obtained elements of structured or unstructured RFP message data, FI computing system 130 may perform any of the exemplary processes described herein to generate elements of characteristic data that include, among other things, adaptively determined values of one or more target characteristics of user 101, a relationship between user 101 and the first financial institution, and further, a relationship between user 101 and the loan product issued by the second financial institution, or with one or more assets that secure the issued loan product. Further, and based on the generated elements of characteristic data, FI computing system 130 may perform any of the exemplary processes described herein to identify one or more targeted incentives or offers that are consistent with the determined values of each, or a selected subset of, the target characteristics of user 101, the relationship between user 101 and the first financial institution, and the relationship between user 101 and the loan product.

In some examples, the targeted offers or incentives may be associated with a financial product or financial service available for provisioning to user 101 by the first financial institution, or with a product or service available for purchase from a merchant having a relationship with the first financial institution (e.g., a merchant-specific product or service). Further, FI computing system 130 may also perform any of the exemplary processes described herein to provision, to a device of user 101 (e.g., client device 102) in real-time and contemporaneously with the receipt of the RFP message, one or more incentive notifications that include elements of digital content associated with corresponding ones of the targeted offers or incentives. Upon presentation within a single screen, or across multiple screens, of a corresponding digital interface of client device 102 by an executed application program (e.g., executed mobile banking application), the one or more incentive notifications may offer corresponding ones of the financial products or services, or corresponding ones of the merchant-specific products or services, to user 101, in real-time and contemporaneously with the payment requested by the second financial institution. Further, and based on confirmation data indicative of an acceptance or one or more of the targeted offers or incentives by user 101, and of an approval of the requested real-time payment requested from user 101 by the second financial institution, FI computing system 130 may perform any of the exemplary processes described herein to provision the one or more targeted offers or incentives to user 101, and further, to generate, and transmit to FI computing system 170, an additional, ISO-2002-compliant RTP message that confirms the approval of real-time payment requested from user 101 by the second financial institution.

To facilitate a performance of one or more of these exemplary processes, FI computing system 130 may maintain, within the one or more tangible, non-transitory memories, a data repository 134 that includes, but is not limited to, a request-for-payment (RFP) message queue 135, a product data store 136, a mapping data store 138, a customer data store 140, and an incentive data store 142. RFP message queue 135 may include one or more discrete RFP messages received by FI computing system 130 using any of the exemplary processes described herein. In some instances, the RFP messages maintained within RFP message queue 135 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the prioritized RFP message to a computing system or device associated with a corresponding customer (e.g., client device 102 associated with user 101), and FI computing system 130 may perform operations that maintain each of the prioritized RFP messages within RFP message queue 135 until a receipt, at FI computing system 130, of confirmation data from corresponding ones of the computing systems or devices indicating an approval, or a rejection, of the corresponding requested payment, or until an expiration of the corresponding pendency period.

Product data store 136 may include one or more structured or unstructured data records that establish a product database 136A of available financial products or loyalty products, which may be offered to customers of first financial institution, such as user 101, through one or more of the targeted offers or incentives described herein. Examples of the available financial products may include, but are not limited to, one or more secured or unsecured credit products (e.g., a credit-card account, an unsecured personal loan, a secured or unsecured line-of-credit, etc.), one or more loan products offered by the financial institution (e.g., a home mortgage, an auto loan, a HELOC, etc.), or one or more financial products associated with these loan products, either by the financial institution or by related entities (e.g., mortgage insurance, etc.). Examples of the available loyalty products include, but are not limited to, one or more loyalty programs established by the financial institution or by the merchants having relationships with the first financial institution. Further, and for each of the financial products, the structured or unstructured data records of product database 136A may further include customer qualification or underwriting process requirements, such as, but not limited to, a minimum income requirement, a minimum credit score requirement, a minimum loan to debt ratio requirement, a maximum total debt requirement, or any other appropriate include customer qualification or underwriting process requirement.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20002-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as other financial institution (e.g., the second financial institution) described herein. For example, as illustrated in FIG. 1, customer data store 140 may include one or more elements of transaction data 140A, which identify and characterize prior payment transactions involving the customers of the first financial institution (such as, but not limited to, user 101), and one or more elements of loyalty data 140B, which identify and characterize one or more loyalty programs offered by the first financial institution to its customers, and in which at least some of the customers of the first financial institution participate (e.g., one or more loyalty programs in which user 101 participates). As an example, loyalty data 140B may identify and characterize a particular program, and a number of "points" that each customer has accumulated. In some examples, a customer, such as user 101, may redeem their points for awards.

Incentive data store 142 may include structured or unstructured data records that maintain elements of available incentive data that identify each of a plurality of targeted offers or incentives available for provisioning to customers of the financial institution, such as user 101, using any of the exemplary processes described herein. Further, in some instances, the structured or unstructured data records of incentive data store 142 may store each of the elements of available incentive data (e.g., associated with corresponding ones of the targeted offers or incentives) in conjunction with corresponding elements of digital content and corresponding elements of elements of layout data, which specify a disposition of the elements of digital content, or visual characteristics of the elements of digital content, when rendered for presentation within a corresponding digital interface by one or more application programs executed by client device 102, such as mobile banking application 108.

Further, and to facilitate the performance of any of the exemplary processes described herein, FI computing system 130 may also maintain, within the one or more tangible, non-transitory memories, an application repository 144 that maintains, but is not limited to, a decomposition engine 146, an analytical engine 148, a notification engine 150, a real-time payment (RTP) engine 152, and a response engine 154, each of which may be executed by the one or more processors of server 132.

For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message, and based on the application of field mapping data 130A to the RFP message, to decompose the RFP message and obtain elements of message data that not only identify and characterize each counterparty involved in a request for payment (e.g., user 101 and the second financial institution, described herein), but that also characterize the requested payment. Further, and upon execution by the one or more processors of FI computing system 130, analytical engine 148 may perform any of the exemplary processes described herein to, based on the elements of message data obtained from the message fields of the RFP message, generate elements of attribute data that include, among other things, predicted values of one or more target characteristics of a customer associated with the RFP message (e.g., user 101), a relationship between each the customer and the first financial institution, and further, a relationship between the customer and the loan product issued by the second financial institution, or one or more assets that secure the issued loan product. Further, and based on the generated elements of attribute data, executed analytical engine 148 may also perform any of the exemplary processes described herein to identify one or more targeted incentives or offers that are consistent with the predicted values of each, or a selected subset of, the target characteristics of the customer, the relationship between the customer and the first financial institution, and the relationship between the customer and the loan product.

Upon execution by the one or more processors of FI computing system 130, notification engine 150 may perform any of the exemplary processes described herein to identify generate a payment notification associated with the requested, real-time payment associated with one or more of the queued RFP message maintained within RFP message queue 135 (e.g., the real-time payment requested by the second financial institution from user 101, etc.), and to generate an incentive notification identifying and characterizing the targeted incentives or offers associated with each of the requested, real-time payments. Executed notification engine 150 may also perform any of the exemplary processes described herein to provision the payment notification, and the associated incentive notifications, to a device associated with a corresponding customer, such as client device 102 operated by user 101. As described herein, the provisioned payment notification may cause one or more application programs executed by client device 102, such as mobile banking application 108, to present elements of digital content that prompt user 101 to approve, or reject, the real-time payment requested by the second financial institution for the issued loan product, and each of the provisioned incentive notification may cause executed mobile banking application 108 to present additional elements of digital content that prompt user 101 to accept, or reject, corresponding ones of the targeted offers or incentives in real-time, and contemporaneously with the receipt of the RFP message.

Upon execution by the one or more processors of FI computing system 130, RTP engine 152 may perform any of the exemplary processes described herein to execute, based on an approval received from a corresponding customer device, a requested real-time payment based on the elements of message data obtained from the message fields of a received RFP message, and based on the executed real-time payment, generate an additional RTP message in accordance with one or more standardized data-exchange protocols, such as the ISO 20022 standard, that confirms the execution of the requested, real-time payment, and that transmits the additional RTP message across network 120 to a computing systems of a corresponding counterparty, either directly or through one of the intermediate computing systems described herein.

Further, and upon execution by the one or more processors of FI computing system 130, response engine 154 may perform any of the exemplary processes described herein to process a response to a provisioned payment notification and/or one or more provisioned incentive notifications from a corresponding device, such as client device 102. For example, as described herein, one or more application programs executed by client device 102, such as mobile banking application 108, may generate and transmit a response to FI computing system 130 that includes confirmation data indicating an approval, or a rejection, of a requested, real-time payment and further, an acceptance, or a rejection, of corresponding ones of targeted offers or incentives.

B. Computer-Implemented Processes for Provisioning Targeted Recommendations in Real-Time based on Decomposed Structured Messaging Data Referring to FIG. 2A, a computing system associated with the first financial institution, such as FI computing system 130, may receive or intercept an RFP message generated by a computing system associated with the second financial institution, such as FI computing system 170. RFP message 225 may be structured and formatted in accordance with the one or more elements of field mapping data 138A and that requests a payment from user 101 for a loan issued to user 101 by the second financial institution and maintained by FI computing system 170. As described herein, RFP message 225 may be structured in accordance with the ISO 20022 standard for electronic data exchange between financial institutions, and in some examples, RFP message 225 may correspond to a pain.013 message as specified within the ISO 20022 standard. Further, and as described herein, the one or more elements of field mapping data 138A may characterize a structure, composition, or format of one or more data fields of ISO-20002-compliant RFP message 225 (e.g., the one or more data fields within a pain.013 message).

As described herein, the ISO-20022-compliant RFP message 225 may be associated with a monthly payment, requested by the second financial institution, for a loan product issued by user 101 by the second financial institution. By way of example, ISO-20022-compliant RFP message 225 may include among other things: (i) message fields populated with data identifying the customer (e.g., user 101) and the financial institution requesting payment from user 101 (e.g., the second financial institution); (ii) message fields populated with data characterizing the requested payment, such as a total payment amount, a requested payment date or a payment due date, the portions of the requested payment that are directed to the escrow account, that are directed to pay down the principal amount, or that are directed to pay off accrued interest; (iii) message fields populated with data identifying the loan product, such as, but not limited to, a type of loan product (e.g., a home mortgage, an auto loan, etc.), a term, a fixed interest rate, a variable interest rate (and a scheduled reset date or scheduled reset dates), the principal amount of the loan product, and/or a payoff amount associated with the loan product; and (iv) a link within a structured or unstructured message field to information, such as remittance data, associated with the requested monthly payment (e.g., a link to a PDF or HTML statement or payment stub that includes any of the information described herein that identifies the financial institution requesting payment, the requesting payment, or the loan product).

A programmatic interface established and maintained by FI computing system 130, such as application programming interface (API) 202, may receive RFP message 225 directly from FI computing system 170 of the second financial institution, or through one or more intermediate computing systems (e.g., one or more clearinghouse systems), and may route RFP message 225 to a decomposition engine 146 executed by the one or more processors of FI computing system 130. In some examples, FI computing system 130 may receive RFP message 225 directly across network 120 via a channel of communications established programmatically between API 202 and FI computing system 170. Further, in some examples, one or more portions of RFP message 225 may be encrypted (e.g., using a public cryptographic key associated with FI computing system 130), and executed decomposition engine 146 may perform operations that access a corresponding decryption key maintaining within the one or more tangible, non-transitory memories of FI computing system 130 (e.g., a private cryptographic key associated with FI computing system 130), and that decrypt the encrypted portions of RFP message 225 using the corresponding decryption key.

In some instances, executed decomposition engine 146 may store RFP message 225 (in decrypted form) within a corresponding portion of data repository 134, e.g., within RFP message queue 135. Executed decomposition engine 146 may also perform operations that access mapping data store 138 (e.g., as maintained within data repository 134), and obtain one or more elements of field mapping data 138A that characterize a structure, composition, or format of one or more data fields of RFP message 225. For example, and as described herein, RFP message 225 may include message fields consistent with the ISO 20022 standard for electronic data exchange between financial institutions, and each of the message fields may be populated with data structured and formatted in accordance with the ISO 20022 standard.

Based on the obtained elements of field mapping data 138A, executed decomposition engine 146 may perform operations that parse RFP message 225 and obtain elements of decomposed field data 204 that identify and characterize user 101, the second financial institution, a loan product, and a requested payment to be made towards the loan product. In some instances, and through the performance of these exemplary operations, executed decomposition engine 146 may "decompose" the structured or unstructured data populating the message fields of RFP message 225 in accordance with field mapping data 138A, and generate the elements of decomposed field data 204 that include, but are not limited to, one or more elements of customer data 206, payment data 208, product data 210, and counterparty data 212.

By way of example, and based on the elements of field mapping data 138A, executed decomposition engine 146 may determine that RFP message 225 includes data within message fields that identify and characterize user 101, and may perform operations that obtain, from RFP message 225, a full name of user 101 (e.g., "Jane A. Doe") and a postal address of user 101 (e.g., "1424 P NW, Washington, D.C., 20005, U.S."). Further, executed decomposition engine 146 may perform additional operations that package the obtained customer name and the customer number into corresponding portions of customer data 206. Additionally, and based on the elements of field mapping data 138A, executed decomposition engine 146 may determine that RFP message 225 includes data that identifies the name of the second financial institution, a payment amount of the requested payment (e.g., $2,000), an account associated with the second financial institution and capable of receiving the requested payment (e.g., an account number), and a requested payment date (e.g., "Jan. 15, 2021"). In some examples, and based on the elements of field mapping data 138A, executed decomposition engine 146 may determine that RFP message 225 includes additional data that identifies those portions of the payment amount allocated to an escrow account (e.g., $500), to pay down the principal amount of the loan product (e.g., $1,300), and to pay down accrued interest (e.g., $200). Executed decomposition engine 146 may perform additional operations that package the data into corresponding portions of payment data 208.

Additionally, and based on the elements of field mapping data 138A, executed decomposition engine 146 may identify one or more further message fields of RFP message 225 include elements of data identifying and characterizing the requested payment, such as, but not limited to, a payment amount of the requested payment (e.g., $2,000), an identifier of an account associated with the second financial institution and available of receiving the requested payment (e.g., a tokenized account number "XXXXXXXXX1234," etc.), and a requested payment date (e.g., "Jan. 15, 2022"), and executed decomposition engine 146 may perform operations that extract the payment amount, the account identifier, and the requested payment date from the further message fields, and that package the extracted payment amount, account identifier, and he requested payment date into corresponding portions of payment data 208. The disclosed embodiments are, however, not limited RFP messages that include these exemplary elements of payment data. For example, and based on the elements of field mapping data 138A, executed decomposition engine 146 may determine that the message fields of RFP message 225 includes additional data that identifies those portions of the payment amount allocated to an escrow account (e.g., $500), to pay down the principal amount of the loan product (e.g., $1,300), and to pay down accrued interest (e.g., $200), and executed decomposition engine 146 may perform additional operations that extract data characterizing the portions of the payment amount allocated to the escrow account, the principal amount and accrued interest and that package the extracted data into additional portions of payment data 208.

Further, and based on the elements of field mapping data 138A, executed decomposition engine 146 may determine that additional, or alternate, message fields of RFP message 225 includes elements of data that identify and characterize the loan product issued by the second financial institution, such as, but not limited to, a type of loan product (e.g., a thirty-year, fixed-rate home mortgage), an interest rate of the loan product (e.g., 3.8% APR), the principal amount of the loan product (e.g., $270,000), and a current payoff amount associated with the loan product (e.g., $267,000). Executed decomposition engine 146 may perform additional operations that extract the elements of data that identify and characterize the loan product from the additional, or alternate, message fields of RFP message 225, and that package the extracted data elements into corresponding portions of product data 210. In some instances, and based on the elements of field mapping data 138A, executed decomposition engine 146 may also determine that additional message fields of RFP message 225 includes elements of counterparty data that identify and characterize the second financial institution, e.g., that issued the loan product to user 101 and that requested the $2,000 monthly payment. By way of example, executed decomposition engine 146 may extract, from the additional message fields of RFP message 225, elements of counterparty data 212 that include, but are not limited to, a name 212A of the second financial institution (e.g., "Bank Claude"), a postal address associated with the second financial institution, or an additional, or alternate, identifier of the second financial institution, such as a SWIFT code. Executed decomposition engine 146 may package the extracted elements of counterparty data 212, include name 212A, into a corresponding portion of decomposed field data 204.

Further, executed decomposition engine 146 may also determine, based on the elements of field mapping data 138A, that a message field of RFP message 225 includes structured or unstructured elements of remittance data that characterizes further the requested monthly payment, user 101, or the second financial institution, and executed decomposition engine 146 may obtain the structured or unstructured elements of remittance data from RFP message 225 and package the obtained elements of remittance data into corresponding portions of remittance information 214. For example, the elements of structured or unstructured remittance data may include a link (e.g., a short-form or tiny URL, a long-form URL, etc.) to formatted statement data associated with the requested monthly payment and maintained by FI computing system 170, and executed decomposition engine 146 may obtain the short- or long-form link from message fields of RFP message 225, and package the short- or long-form link into remittance information 214, e.g., as URL 215.

In some instances, the one or more processors of FI computing system 130 may execute a remittance analysis engine 216, which may perform operations that, based on URL 215 maintained within remittance information 214 of decomposed field data 204, programmatically access elements of formatted statement data 218 maintained at FI computing system 170 of the second financial institution, and that process the accessed elements of formatted statement data 218 to obtain additional, or alternate, elements of customer data 206, payment data 208, product data 210, or counterparty data 212. For example, remittance analysis engine 216 may access URL 215 maintained within remittance information 214 (e.g., the short- or long-form URL described herein, etc.), and may process URL 215 and generate a corresponding HTTP request 220 for the elements of formatted statement data 218 maintained at FI computing system 170. Executed remittance analysis engine 216 may also perform operations that cause FI computing system 130 to transmit HTTP request 220 across network 120 to FI computing system 170.

Figure 2A:
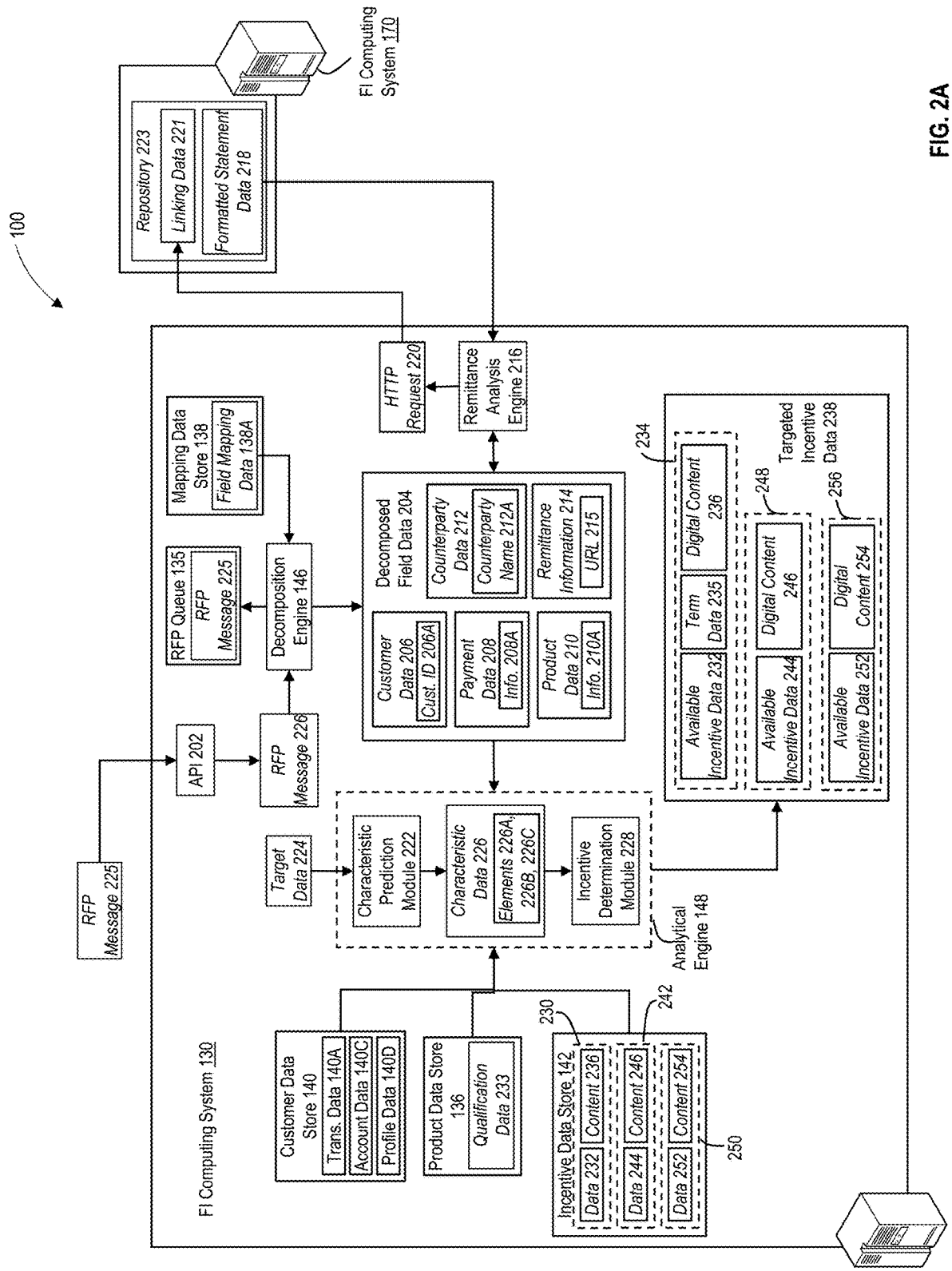
FIGS. 2A, 2B, 2C, and 3 are block diagrams illustrating portions of an exemplary computing environment, in accordance with some exemplary embodiments.

FI computing system 170 may, for example, receive HTTP request 220, and based on portions of HTTP request 220 and linking data 221 (e.g., based on a determined match or correspondence between the portions of HTTP request 220 and linking data 221), FI computing system 170 may perform operations that obtain the elements of formatted statement data 218 from data repository 223, and that transmit the elements of formatted statement data 218 across network 120 to FI computing system 130, e.g., as a response to HTTP request 220. Further, as illustrated in FIG. 2A, executed remittance analysis engine 216 may receive the elements of formatted statement data 218 from FI computing system 170, and may perform any of the exemplary processes described herein to parse the elements of formatted statement data 218 (e.g., in a received format, such as a PDF or HTML form, or in a transformed or enhanced format, etc.) and obtain, from the parsed elements of formatted statement data 218, one or more of the additional, or alternate, elements of customer data 206, payment data 208, product data 210, or counterparty data 212. By way of example, executed remittance analysis engine 216 may apply one or more optical character recognition (OCR) processes or optical word recognition (OWR) processes to the elements of formatted statement data 218 in PDF form to generate, or obtain, elements of textual content representative of the data that characterize user 101, the second financial institution, the loan product issued by the second financial institution, or the requested payment.

By way of example, executed remittance analysis engine 216 may perform operations that detect a presence one or more keywords within the generated elements of textual content (e.g., "monthly payment," "principal," "interest rate," etc.), and may extract elements of the textual content associated with these keywords as corresponding ones of the additional, or alternate, elements of customer data 206, payment data 208, product data 210, or counterparty data 212. In other examples, executed remittance analysis engine 216 may detect a presence of the additional, or alternate, elements of customer data 206, payment data 208, product data 210, or counterparty data 212 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.)or a decision-tree process that ingests input datasets composed of all, or selected portions, of the textual content. The disclosed embodiments are, however, not limited to exemplary processes for detecting and extracting one or more of the additional, or alternate, elements of customer data 206, payment data 208, product data 210, or counterparty data 212 from the generated textual content, and in other instances, executed remittance analysis engine 216 may perform any additional, or alternate, process for identifying one or more of the additional, or alternate, elements of customer data 206, payment data 208, product data 210, or counterparty data 212 within the textual content derived from the processing of the elements of formatted statement data 218 in PDF format.

Further, and as described herein, the elements of formatted statement data 218 may be structured in HTML form, and may include metadata that identify and characterize user 101 (e.g., the customer name, etc.), the second financial institution (e.g., the name or other identifier, etc.), the requested payment (e.g., a payment amount, etc.), or the loan product issued by the second financial institution (e.g., an interest rate, an amount of remaining principal, etc.). Executed remittance analysis engine 216 may perform operations that detect one or more of the elements of metadata within the elements of formatted statement data 218, and that obtain, from the elements of metadata, additional, or alternate, elements of customer data 206, payment data 208, product data 210, or counterparty data 212, as described herein. The disclosed embodiments are, however, not limited to these exemplary processes for detecting and extracting the additional, or alternate, elements of customer data 206, payment data 208, product data 210, or counterparty data 212 from HTML-formatted receipt data, and in other instances, executed remittance analysis engine 216 may perform any additional, or alternate, process detecting and obtaining data from the elements of formatted statement data 218 structured in HTML form, including, but not limited to, an application of one or more screen-scraping processes to portions of formatted statement data 218 structured in HTML form.

In some instances, executed decomposition engine 146 may perform operations that store decomposed field data 204, which includes the element of customer data 206, payment data 208, product data 210, counterparty data 212, and remittance information 214, within a corresponding portion of data repository 134 (not illustrated in FIG. 2), and may provide decomposed field data 204 as an input to analytical engine 148 of FI computing system 130. Upon execution by the one or more processors of FI computing system 130, executed analytical engine 148 may perform any of the exemplary processes described herein to, based on decomposed field data 204, generate elements of characteristic data that include, among other things, adaptively determined values of one or more target characteristics of a customer associated with the RFP message (e.g., user 101), a relationship between the customer and the first financial institution, and further, a relationship between the customer and the loan product issued by the second financial institution, or with one or more assets that secure the issued loan product. Further, and based on the generated elements of characteristic data, executed analytical engine 148 may also perform any of the exemplary processes described herein to identify one or more targeted incentives or offers that are consistent with the determined values of each, or a selected subset of, the target characteristics of the customer, the relationship between the customer and the first financial institution, and the relationship between the customer and the loan product, and to store elements of each of the targeted offers or incentives within a corresponding portions of data repository 134, e.g., in conjunction with queued RFP message 225.

By way of example, a characteristic prediction module 222 of executed analytical engine 148 may access decomposed field data 204, and based on the elements of customer data 206, payment data 208, product data 210, or counterparty data 212, and the elements of transaction data 140A, account data 140C, or customer profile data 140D associated with user 101, determine, or infer, a value of one or more target customer characteristics of user 101 (e.g., the customer of the first financial institution associated with queued RFP message 225), of the relationship between user 101 and the first financial institution, and further, the relationship between user 101 and the loan product issued by the second financial institution (or with one or more assets that secure the issued loan product). In some instances, characteristic prediction module 222 may access customer data 206, and obtain a unique customer identifier 206A of user 101, such as, but not limited to, a customer name (e.g., "Jane A. Doe") or an alphanumeric login credential associated with user 101. Further, characteristic prediction module 222 may access payment data 208 and obtain payment information 208A that includes, among other things, the $2,000 requested, real-time payment and the requested payment date of Jan. 15, 2022 (e.g., from payment data 208), and may access product data 210 and obtained product information 310A that includes, among other things, the type of loan product issued by the second financial institution (e.g., a thirty-year, fixed-rate home mortgage), the interest rate of the loan product (e.g., 3.8% APR), the principal amount of the loan product (e.g., $270,000) and the current payoff amount associated with the loan product (e.g., $268,700), or those portions of the $2,000 payment allocated to the escrow account (e.g., $500), and to pay down the principal amount of the loan product (e.g., $1,300) and accrued interest (e.g., $200).

Further, as illustrated in FIG. 2A, executed characteristic prediction module 222 may also obtain elements of target data 224, which identify each of target customer characteristics and in some instances, include additional information that facilitates the prediction of the corresponding, customer-specific predicted values. By way of example, the target customer characteristics may include one or more product-specific characteristics associated with, and specific to, the type of loan product issued to user 101 by the second financial institution, or to an asset that secures the issued loan product. For instance, and for the thirty-year, fixed-rate mortgage issued to user 101 by the second financial institution, the product-specific characteristics may include, but are not limited to, an experience of user 101 as a homeowner (e.g., a first-time home owner, a long-term home owner, a long-term renter without home-owning or buying experience, etc.) and a temporal position of user 101 within the corresponding, thirty-year term of the fixed-rate home mortgage. The elements of target data 224 may include a corresponding identifier of each of the product-specific characteristics (e.g., an alphanumeric character string, such as a characteristic name, etc.), and in some instances, candidate values, or value ranges, of one or more of the product-specific characteristics.

Additionally, in some examples, the target customer characteristics may also include one or more demographic characteristics may be associated with corresponding demographic parameters that characterize user 101 and other customers of the financial institution. For instance, the demographic characteristics may include, but are not limited to, a range of ages that characterize one or more children or other dependents supported by user 101 and the other customers of the financial institution, and the elements of target data 224 may include a corresponding identifier of each of the demographic characteristics (e.g., an alphanumeric character string, such as a characteristic name, etc.), and in some instances, candidate values, or value ranges, of the one or more of the demographic parameters (e.g., the age ranges described herein, etc.). The disclosed embodiments are, however, not limited to these exemplary product-specific or demographic characteristics, and in other examples, the elements of target data 224 may identify and characterize any additional, or alternate, characteristic of user 101, of the relationship between user 101 and the first financial institution, and/or the relationship between user 101 and the loan product issued by the second financial institution (or with one or more assets that secure the issued loan product).

Referring back to FIG. 2A, executed characteristic prediction module 222 may parse the elements of target data 224 and obtain the identifier, and in some instances, the information characterizing the candidate values or ranges of values, associated with each of the one or more target customer characteristics. Executed characteristic prediction module 222 may also perform any of the exemplary processes described herein to predict, for each of the one or more target customer characteristics identified by target data 224, a corresponding characteristic value for user 101 based on, among other things, the elements of customer data 206, payment data 208, product data 210, or counterparty data 212 within decomposed field data 204, and the elements of transaction data 140A, account data 140C, or customer profile data 140D associated with user 101. Further, executed characteristic prediction module 222 may package the predicted characteristic value for each of the target customer characteristics, and the corresponding characteristic identifier, into elements of characteristic data 226.

By way of example, executed characteristic prediction module 222 may obtain the characteristic identifier of the product-specific characteristic associated with the temporal position of user 101 within the corresponding, thirty-year term of the fixed-rate home mortgage issued to user 101 by the second financial institution. Executed characteristic prediction module 222 may perform operations that obtain the requested $2,000 payment amount from payment data 208 of decomposed field data 204, that obtain the principal amount (e.g., $270,000) and the current payoff amount (e.g., $268,700) associated with the home mortgage from product data 210 of decomposed field data 204, and further, that obtain one or more elements of transaction data 140A associated with user 101, e.g., as maintained within customer data store 140. In some instanes, and based on the $2,000 requested payment, the $270,000 principal amount, and the $268,700 payoff amount, and the accessed elements of transaction data 140A, executed characteristic prediction module 222 may determine that the requested monthly payment represents the second payment of the term of the home mortgage, and may package the determined characteristic value associated with the temporal position of user 101 within corresponding, thirty-year term of the fixed-rate home mortgage (e.g., that the requested monthly payment represents the second payment of the term) and the characteristic identifier of the product-specific characteristic within a corresponding element 226A of characteristic data 226.

Further, in some examples, executed characteristic prediction module 222 may obtain the characteristic identifier of an additional product-specific characteristic associated with the experience of user 101 as a homeowner (and in some instances, the information characterizing the candidate values or ranges of values for the additional product-specific characteristic). Executed characteristic prediction module 222 may perform operations that obtain data indicating the type of loan product issued by the second financial institution (e.g., a thirty-year, fixed-rate home mortgage) from product data 210 of decomposed field data 204, that obtain data indicating a customer age (e.g., thirty-one years of age) from customer profile data 140D of customer data store 140, and that obtain one or more elements of transaction data 140A associated with user 101. In some instances, and based on the determination that the requested monthly payment represents the second payment of the term of the home mortgage, executed characteristic prediction module 222 may process the obtained elements of transaction data 140A and determine that, within a prior temporal interval of prior duration (e.g., a two-month interval), user 101 initiated a purchase of property insurance associated with a newly purchased home, and that user 101 initiated multiple purchase transactions involving home furnishings. Based on the initiated purchase of the property insurance and the initiated purchase transactions involving the home furnishings, and based on the determined age of user 101 (e.g., thirty-one years of age) and on the type of loan product issued to user 101 by the second financial institution (e.g., the thirty-year, fixed-rate home mortgage), executed characteristic prediction module 222 may determine, or infer, that user 101 represents a first-time homeowner, and may package data characterizing the experience of user 101 as a homeowner (e.g., a first-time homeowner) and the characteristic identifier of the additional product-specific characteristic into a corresponding element 226B of characteristic data 226.

Executed characteristic prediction module 222 may also parse target data 224 and obtain a characteristic identifier of a demographic characteristic associated with the age range of one or more children (or other dependents) supported by user 101 (and further, the information characterizing the candidate values or ranges of values for the demographic characteristic). In some instances, executed characteristic prediction module 222 may perform operations that obtain one or more elements of transaction data 140A associated with user 101, and that process the obtained elements of transaction data 140A to detect occurrences of one or more predetermined purchase transactions involving products of services indicative of the age range of the supported children. For example, executed characteristic prediction module 222 may detect, within the obtained elements of transaction data 140A associated with user 101, occurrences of purchase transactions involving child care and diapers, and additionally, or alternatively, purchase transactions involving merchants or retailers that offer baby furniture or children's clothing for sale. Based on the detected occurrences of these purchase transactions within the elements of transaction data 140A associated with user 101, executed characteristic prediction module 222 may determine, or infer, that user 101 supports young children, and may package data characterizing the age range of one or more children supported by user 101 as a homeowner (e.g., young children) and the characteristic identifier of the demographic characteristic into a corresponding element 226C of characteristic data 226.

In some instances, and to determine the value of one, or more, of the target customer characteristics associated with user 101, executed characteristic prediction module 222 may perform operations that apply a trained machine learning or artificial intelligence process to a corresponding input dataset obtained, or extracted from, portions of customer data 206 26, payment data 208, or product data 210 of decomposed field data 204, and one or more of the elements of transaction data 140A, account data 140C, or customer profile data 140D associated with user 101. Based on the application of the trained machine learning or artificial intelligence process to the corresponding input dataset, executed characteristic prediction module 222 may predict the value of one, or more, of the target customer characteristics associated with user 101, such as, but not limited to, one or more of the exemplary product-specific and demographic characteristics described herein.

Examples of the trained machine-learning and artificial-intelligence processes may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning and artificial-intelligence processes may also include, among other things, a decision tree process (e.g., a boosted decision tree algorithm, etc.), a random decision forest, an artificial neural network, a deep neural network, or an association-rule process (e.g., an Apriori algorithm, an Eclat algorithm, or an FP-growth algorithm). Further, and as described herein, each of these exemplary machine-learning and artificial-intelligence processes may be trained against, and adaptively improved using, elements of training and validation data, and may be deemed successfully trained and ready for deployment when a value of one or more performance or accuracy metrics are consistent with one or more threshold training or validation criteria.

For instance, the trained machine learning or artificial intelligence process may include a trained decision-tree process, and executed incentive determination module 228 may obtain, from one or more tangible, non-transitory memories, elements of process input data and process parameter data associated with the trained decision-tree process (not illustrated in FIG. 2A). For example, the elements of process input data may characterize a composition of the input dataset for the trained decision-tree process and identify each of the discrete data elements within the input data set, along with a sequence or position of these elements within the input data set, and the elements of process parameter data may include a value for one or more parameters of the trained decision-tree process. Examples of these parameter values include, but are not limited to, a learning rate associated with the trained, decision-tree process, a number of discrete decision trees included within the trained, decision-tree process, a tree depth characterizing a depth of each of the discrete decision trees, a minimum number of observations in terminal nodes of the decision trees, and/or values of one or more hyperparameters that reduce potential process overfitting.

In some examples, not illustrated in FIG. 2A, executed characteristic prediction module 222 may perform operations that generate one or more discrete elements (e.g., "feature values") of the input dataset in accordance with the elements of process input data and based on the portions of portions of customer data 206, payment data 208, or product data 210 of decomposed field data 204, and one or more of the elements of transaction data 140A, account data 140C, or customer profile data 140D associated with user 101. Based on portions of the process parameter data, executed characteristic prediction module 222 may perform operations that establish a plurality of nodes and a plurality of decision trees for the trained decision-tree process, each of which receive, as inputs (e.g., "ingest"), corresponding elements of the input dataset. Further, and the ingestion of the input dataset by the established nodes and decision trees of the trained decision-tree process, executed incentive determination module 228 may perform operations that apply the trained, decision-tree process to the input dataset, and that generate the value of one, or more, of the product-specific or demographic characteristics associated with user 101.

The disclosed embodiments are, however, not limited to these exemplary product-specific or demographic characteristics, or to the exemplary values of these product-specific or demographic characteristics, which determined, predicted, or inferred for user 101 by executed characteristic prediction module 222. In other instances, exemplary characteristic prediction module 222 may perform any of the exemplary processes described herein to obtain a characteristic identifier associated with an additional, or alternate, one of the target customer characteristics from target data 224 (and in some instances, information characterizing the candidate values or ranges of values for the additional, or alternate, one of the target customer characteristics), predict, for the additional, or alternate, one of the target customer characteristics, a corresponding characteristic value for user 101, and to package the predicted characteristic value, and the characteristic identifier, into a corresponding one of the elements of characteristic data 226.

Referring back to FIG. 2A, executed characteristic prediction module 222 may provide characteristic data 226, including elements 226A, 226B, and 226C that include the determined or inferred values of corresponding ones of the product-specific and demographic characteristics, as an input to an incentive determination module 228 of executed analytical engine 148. In some instances, and based on the elements 226A, 226B, and 226C of characteristic data 226 associated with user 101, executed incentive determination module 228 may perform any of the exemplary processes described herein to obtain the determined or inferred values of each, or a selected subset, of the target customer characteristics associated with user 101, such as, but not limited to, the determined or inferred values of the exemplary product-specific and demographic characteristics described herein. Executed incentive determination module 228 may, for example, receive characteristic data 226 (including elements 226A, 226B, and 226C that include the determined or inferred values of corresponding ones of the product-specific and demographic characteristics for user 101), and based on elements 226A, 226B, and 226C of characteristic data 226, executed incentive determination module 228 may establish that user 101 represents a first-time homeowner, that the real-time payment requested by the second financial institution represents the second monthly payment within corresponding, thirty-year term of the fixed-rate home mortgage issued to user 101 by the second financial institution, and that user 101 supports young children.

Executed incentive determination module 228 may also access incentive data store 142 (e.g., as maintained within data repository 134), and may parse the structured or unstructured data records of incentive data store 142 to identify elements of available incentive data associated with corresponding targeted offers or incentives that are consistent with the determined or inferred values of each, or a selected subset of, the target characteristics specified within characteristic data 226. By way of example, executed incentive determination module 228 may access record 230 incentive data store 142, which may include available incentive data 232 identifying and characterizing a targeted offer to provision mortgage insurance to customers that hold a home mortgage. Based on elements 226A, 226B, or 226C of characteristic data 226, executed incentive determination module 228 may establish that user 101 represents a first-time homeowner and that the real-time payment requested by the second financial institution represents the second monthly payment within corresponding, thirty-year term of the fixed-rate home mortgage issued to user 101 by the second financial institution, and may determine that the targeted offer to provision the mortgage insurance is consistent with user 101's status as a first-time homeowner and with user 101's current position within the thirty-year term of the fixed-rate home mortgage.

In some instances, executed incentive determination module 228 may access product database 136A of product data store 136, and obtain elements of qualification data 233 that identify one or more one or more internal qualification or underwriting procedures associated with a provisioning of the mortgage insurance to user 101. For example, and based on the elements of qualification data 233, executed incentive determination module 228 may perform operations that apply the one or more internal qualification or underwriting procedures to portions of product data 210 that identify and characterize the thirty-year, fixed-rate mortgage issued to user 101 by the second financial institution (e.g., the type of loan product, the 3.8% interest rate of the loan product, the $270,000 principal amount, and the current $268,700 payoff amount) to elements of transaction data 140A, account data 140C, and customer profile data 140D associated with user 101, and further, to additional elements of data characterizing user 101's interactions with the financial institution associated with FI computing system 130 and with other financial institutions, and a use, or misuse, of financial products or services provisioned to user 101 by the financial institution or by the other financial institution. The additional elements of data may include, but are not limited to, one or more elements of reporting data maintained by a corresponding credit bureau or other reporting entity, and the elements of reporting data may include, but are not limited to, a credit score assigned to user 101 by the credit bureau or reporting entity or a number of credit inquiries associated with user 101 during one or more temporal intervals.

In some instances, and based on an application of the one or more internal qualification or underwriting procedures to the portions of product data 210, to the elements of transaction data 140A, account data 140C, and customer profile data 140D associated with user 101, and to the elements of reporting data associated with user 101, executed incentive determination module 228 may determine that mortgage insurance associated with the thirty-year, fixed-rate mortgage is available for provisioning to user 101 at a cost of 0.8% of the $270,000 principal amount on a year-over-year basis, e.g., $2,160 per year or $180 per month. Executed incentive determination module 228 may generate elements of term data 235, which identify the determined terms and conditions of the available mortgage insurance (e.g., the yearly rate and the resulting monthly cost, etc.), and store the generated elements of term data 235 within a corresponding portion of account data 140C, along with customer identifier 206A (not illustrated in FIG. 2A). Further, executed incentive determination module 228 may perform any of the exemplary processes described herein to obtain, from record 230 of incentive data store 142, one or more elements of digital content 236 associated with the targeted offer to provision the mortgage insurance to user 101 in accordance with the determined terms and conditions. Executed incentive determination module 228 may also perform operation that package at least a portion of available incentive data 232, term data 235, and the elements of digital content 236 within a corresponding portion of targeted incentive data 238, e.g., within element 234.

Further, as illustrated in FIG. 2A, executed incentive determination module 228 may also access record 242 incentive data store 142, which includes available incentive data 244 identifying and characterizing a targeted offer associated with a tax-exempt, college savings plan available to customers that support young children, and based on one or more of elements 226A, 226B, or 226C of characteristic data 226, executed incentive determination module 228 may determine that the targeted offer associated with the tax-exempt, college savings plan is consistent with at least user 101's support of the young children or dependents. In some instances, executed incentive determination module 228 may obtain one or more elements of digital content 246 that identify or characterize the targeted offer associated with the available, tax-exempt college savings account (and with the elements of available incentive data 244) from record 242, and may package a portion of available incentive data 244 (e.g., that includes a URL associated with the targeted offer and the available, tax-exempt college savings account) and the elements of digital content 246 within a corresponding portion of targeted incentive data 238, e.g., within element 248.

Further, executed incentive determination module 228 may also access record 250 of incentive data store 142, which includes available incentive data 252 identifying and characterizing and additional targeted offer associated with product or service available for provisioning by a merchant having a relationship with the first financial institution. For example, the merchant may correspond to a landscaping company located within a threshold distance of the newly purchased home of user 101, or operating within the postal code associated with the newly purchased home (e.g., as established by the postal address of user 101 maintained within customer data 206 of decomposed field data 204, etc.), and the landscaping company may represent a business customer of the first financial institution. In some instances, the additional targeted offer may include, but is not limited to, a predetermined discount, such as a 25% discount, on landscaping products and services provided to customers by the landscaping company, and based on elements 226A, 226B, or 226C of characteristic data 226 to establish that user 101, executed incentive determination module 228 may determine that the additional targeted offer associated with the discounted landscaping products and services is consistent with user 101's status as a first-time homeowner and with user 101's current position with executed incentive determination module 228 may obtain one or more elements of digital content 254 that identify or characterize the additional targeted offer associated with the discounted landscaping products (and with the elements of available incentive data 252) from record 250, and may package a portion of available incentive data 252 (e.g., that includes a URL associated with the additional targeted offer and the landscaping company), and the elements of digital content 246 within a corresponding portion of targeted incentive data 238, e.g., within element 256.

The disclosed embodiments are, however, not limited to the targeted offers associated with the mortgage insurance, the tax-exempt college savings plan, and the predetermined discount on landscaping products and services provided by the landscaping company, and in other instances, executed incentive determination module 228 may perform any of the exemplary processes described herein to generate elements of targeted incentive data 238 that identify and characterize any additional, or alternate, targeted offers of incentives that are characterized by the data records of incentive data store 142, and that are consistent with the determined or inferred values of each, or a selected subset of, the target characteristics specified within characteristic data 226. Further, executed incentive determination module 228 may perform operations that store the elements of targeted incentive data 238 within a corresponding portion of data repository 134, e.g., in conjunction with decomposed field data 204 and queued RFP message (not illustrated in FIG. 2A), and executed analytical engine 148 may provision targeted incentive data 238, including elements 240, 248, and 256, as an input to notification engine 150, which when executed by the one or more processors of FI computing system 130, may perform any of the exemplary processes described herein to generate a payment notification associated with the real-time payment of $2,000.00 requested by the second financial institution (e.g., the second monthly payment for the thirty-year, fixed-rate mortgage issued to user 101), and to generate an incentive notification associated with one, or more, of the targeted offers or incentives that consistent are consistent with the determined or inferred values of each, or a selected subset of, the target characteristics specified within characteristic data 226, e.g., as characterized by corresponding ones of the elements of targeted incentive data 238.

Figure 2B:
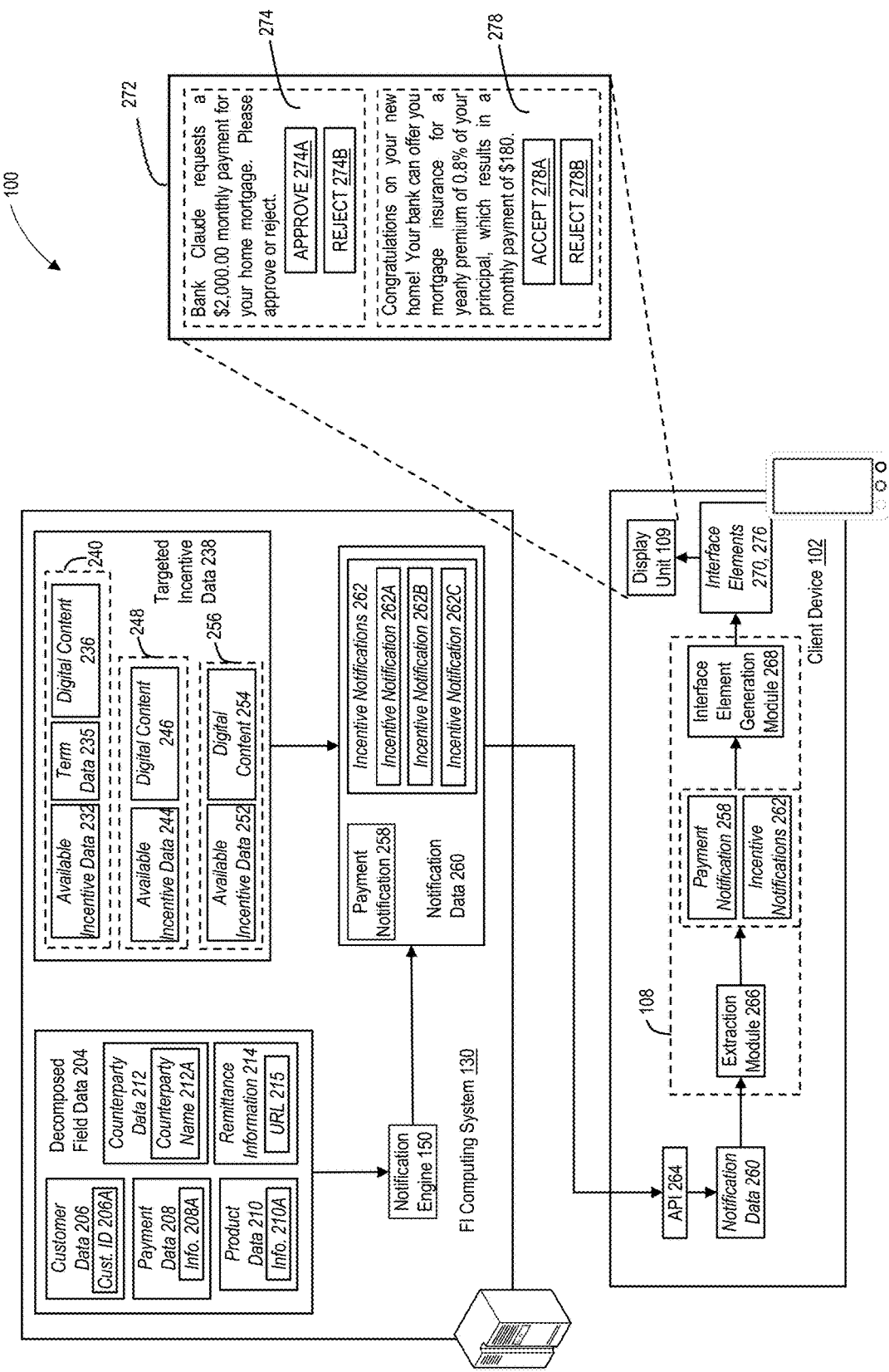

Referring to FIG. 2B, executed notification engine 150 may receive the elements of targeted incentive data 238, including elements 240, 248, and 256 associated the targeted offers and incentives that are consistent with the target customer characteristics specified within corresponding ones of elements 226A, 226B, or 226C of characteristic data 226. Executed notification engine 150 may also perform operations that access data repository 134, and obtain decomposed field data 204 that includes one or more elements of customer data 206, payment data 208, product data 210, counterparty data 212, and remittance information 214 obtained from the structured or unstructured message fields of RFP message 225 and as such, that characterize the $2,000.00 real-time payment requested from user 101 by the second financial institution. In some instances, executed notification engine 150 may parse customer data 206 within decomposed field data 204 to obtain a customer identifier 206A of user 101, such as, but not limited, a full name of user 101 extracted from the message fields of the RFP message 225 (e.g., "Jane A. Doe"). Further, executed notification engine 150 may also perform operations that parse payment data 208 to obtain payment information 208A that identifies the $2,000.00 requested payment, and, in some examples, the requested payment date, and that parse counterparty data 212 to obtain counterparty name 212A (e.g., "Bank Claude"). Executed notification engine 150 may perform additional operations that generate a payment notification 258 that includes customer identifier 206A, the portion of payment information 208A that specifies the $2,000.00 payment amount and a requested payment date (e.g., Jan. 15, 2022), and counterparty name 212A, and package payment notification 258 into a corresponding portion of notification data 260.

Further, and based on the one or more elements of customer data 206, payment data 208, product data 210, counterparty data 212, and remittance information 214, and based on the elements of targeted incentive data 238, executed notification engine 150 may generate one or more incentive notifications 262 that identify and characterize corresponding ones of the targeted offers or incentives described herein. For example, as illustrated in FIG. 2B, incentive notifications 262 may include an incentive notification 262A associated the targeted offer to provision, to user 101, mortgage insurance associated with the thirty-year, fixed-rate mortgage issued by the second financial institution. In some instances, incentive notification 262A may include, all, or a selected potion of element 240 of targeted incentive data 238, such as a portion of available incentive data 232 (e.g., that identifies the available mortgage insurance), a portion of term data 235 (e.g., that identifies the yearly rate of 0.8% of the $270,000 principal amount and the monthly cost of $180, etc.), and the elements of digital content 236. Further, incentive notifications 262 may include an incentive notification 262B associated with the targeted offer to provision the available, tax-exempt, college savings plan to user 101, and incentive notification 262B may include, all, or a selected potion of element 248 of targeted incentive data 238, such as the portion of available incentive data 244 that includes the URL associated with the targeted offer and the available, tax-exempt college savings account and the elements of digital content 246. Incentive notifications 262 may also include an incentive notification 262C associated with the additional targeted offer of the discounted landscaping products from the landscaping company having the relationship with the financial institution, and incentive notification 262C may include, all, or a selected potion of element 256 of targeted incentive data 238, such as the portion of available incentive data 252 that includes the URL associated with the additional targeted offer and the landscaping company and the elements of digital content 254.

Executed notification engine 150 may package incentive notifications 262, including incentive notifications 262A, 262B, and 262C, into corresponding portions of notification data 260. In some instances, executed notification engine 150 may perform operations that cause FI computing system 130 to transmit notification data 260, including payment notification 258 and each of incentive notifications 262, across network 120 to client device 102. A programmatic interface established and maintained by client device 102, such as application programming interface (API) 264 associated with mobile banking application 108, may receive notification data 260, and may perform operations that trigger an execution (e.g., via a programmatic command, etc.) of mobile banking application 108 by the one or more processors of client device 102, e.g., processor 104. In some instances, API 264 may route notification data 260 to an extraction module 266 of executed mobile banking application 108.

As described herein, executed extraction module 266 may receive notification data 260, which includes payment notification 258 and each of incentive notifications 262 (e.g., incentive notifications 262A, 262B, and 262C), and may perform operations that parse payment notification 258 to obtain customer identifier 206A, the portion of payment information 208A that specifies the $2,000.00 payment amount for the monthly mortgage payment requested from user 101 by the second financial institution, and counterparty name 212A (e.g., "Bank Claude"), which executed extraction module 266 may provide as an input to an interface element generation module 268 of executed mobile banking application 108. In some instances, executed interface element generation module 268 may perform operations that generate one or more interface elements 270 based on customer identifier 206A, the portion of payment information 208A that specifies the $2,000.00 payment amount for the monthly mortgage payment requested from user 101 by the second financial institution, and counterparty name 212A, and provide interface elements 270 to display unit 109A.

When rendered for presentation within notification interface 272 by display unit 109A, interface elements 270 provide a graphical representation 274 of the request for the $2,000.00 payment amount for the monthly mortgage payment requested from user 101 by the second financial institution, and prompt user 101 to approve or reject the requested payment, e.g., based on additional input provided to input unit 109B of client device 102 that selects a respective one of an "APPROVE" icon 274A and a "REJECT" icon 274A presented within notification interface 272. For example, user 101 may elect to approve the requested payment (e.g., to send payment to the second financial institution) by providing input (e.g., via input unit 109B) to select the "APPROVE" icon 274A, or may decline the requested payment by providing input to select the "REJECT" icon 274A, and client device 102 may perform operations that generate and one or more elements of a payment response indicative of the approved or decline payment, and that transmit the payment response across network 120 to FI computing system 130 (not illustrated in FIG. 2B).

In some instances, executed extraction module 266 may also perform operations that parse one or more of incentive notifications 262, such as incentive notification 262A associated the targeted offer to provision, to user 101, mortgage insurance associated with the thirty-year, fixed-rate mortgage issued by the second financial institution in accordance with the determined terms and conditions, and obtain, from incentive notification 262A, the portion of available incentive data 232 that identifies the mortgage insurance available to user 101, term data 235 that identifies one or more terms and condition of the available mortgage insurance, and the elements of digital content 236. By way of example, and as described herein, the terms and condition of the available mortgage insurance may include, but are not limited to, the determined yearly rate of 0.8% of the $270,000 principal amount and the resulting monthly cost of $180, and executed extraction module 266 may provide the extracted the portion of available incentive data 232, term data 235, and the elements of digital content 236 as inputs to executed interface element generation module 268, which may perform operations that generate additional interface elements 276 based on portions of available incentive data 232, term data 235, and the elements of digital content 236, and that route interface elements 276 to display unit 109A.

When rendered for presentation within a corresponding notification interface 272 by display unit 109A, interface elements 276 provide a graphical representation 278 of the targeted offer to provision the mortgage insurance available to user 101 in accordance with the determined terms and conditions within a single display screen or window, or across multiple display screens or windows, of notification interface 272. For example, when presented within notification interface 272, graphical representation 274 may identify the available, mortgage insurance and present the targeted offer, and the determined terms and conditions, in real-time and contemporaneously with the presentation of graphical representation 274, and prompt user 101 to accept the offer to fund at least a portion of the requested, real-time payment of $905.00 associated with user 101 purchase of the three, economy-class airline tickets from merchant 111, e.g., based on input provided to input unit 109B of client device 102 that selects a respective one of an "ACCEPT" icon 278A and a "DECLINE" icon 278B presented within notification interface 272.

Executed extraction module 266 may also perform operations that parse an additional, or alternate, ones of incentive notifications 262, such as incentive notification 262B associated with the targeted offer to provision the available, tax-exempt, college savings plan to user 101 and incentive notification 262C associated with the additional targeted offer of the discounted landscaping products from the landscaping company having the relationship with the financial institution. As described herein, incentive notification 262B may include, all, or a selected potion of element 248 of targeted incentive data 238, such as the portion of available incentive data 244 that includes the URL associated with the targeted offer and the available, tax-exempt college savings account and the elements of digital content 246, and incentive notification 262C may include, all, or a selected potion of element 256 of targeted incentive data 238, such as the portion of available incentive data 252 that includes the URL associated with the additional targeted offer and the landscaping company and the elements of digital content 254.

Figure 2C:
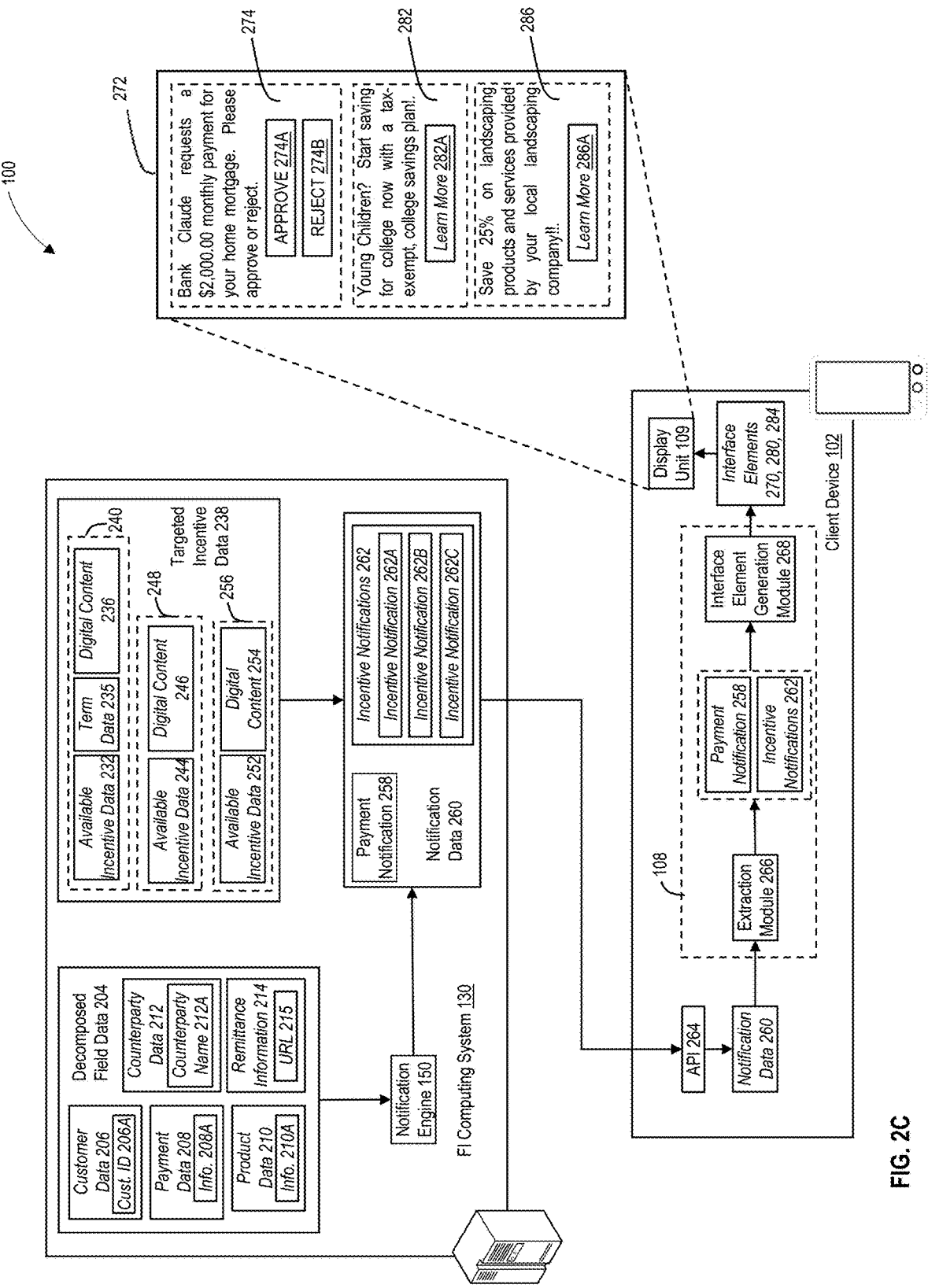

Referring to FIG. 2C, executed extraction module 266 may provide the obtained portion of available incentive data 244 and the elements of digital content 246 to executed interface element generation module 268, which may perform operations that generate additional interface elements 280 based on portions of available incentive data 244 and digital content 246, and that route interface elements 280 to display unit 109A. When rendered for presentation within a corresponding notification interface 272 by display unit 109A, interface elements 280 provide a graphical representation 282 of the targeted offer associated with the available, tax-exempt college savings account within a single display screen or window, or across multiple display screens or windows, of notification interface 272. For example, interface elements 270 may, when presented within notification interface 272, graphical representation 282 may identify the available, tax-exempt college savings account and present the additional, merchant-specific offer in real-time and contemporaneously with the presentation of graphical representation 274, and prompt user 101 to obtain information associated with the available, tax-exempt college savings account, such as eligibility information or information identifying terms and conditions, in real-time and contemporaneously with the approval or rejection of the requested, real-time payment of $2,000.00 to the second financial institution, e.g., based on input provided to input unit 109B of client device 102 that selects a an "LEARN MORE" icon 282A presented within notification interface 272.

For example, upon viewing graphical representation 282, user 101 may elect to obtain the information associated with the available, tax-exempt college savings account, and may provide input to client device 102 (e.g., via input unit 109B) that selects "LEARN MORE" icon 282A presented within notification interface 272. Based on the selection of icon 282A, input unit 109B may route corresponding elements of input data indicative of the selection of "LEARN MORE" icon 282A to executed mobile banking application 108, which may perform operations (not illustrated in FIG. 2C), that access available incentive data 244 and that obtain the URL associated with the targeted offer and the available, tax-exempt college savings account. In some instances, not illustrated in FIG. 2C, executed mobile banking application 108 may perform operations that trigger programmatically one or more additional application programs maintained within memory 106, such as the web browser described herein, and that provision the obtained URL to the executed web browser, which may cause display unit 109A to present portions of the web page associated with the available, tax-exempt college savings account.

Referring back to FIG. 2C, executed extraction module 266 may provide the obtained portion of available incentive data 252 and the elements of digital content 254 to executed interface element generation module 268, which may perform operations that generate additional interface elements 284 based on portions of available incentive data 252 and digital content 254, and that route interface elements 284 to display unit 109A. When rendered for presentation within a corresponding notification interface 272 by display unit 109A, interface elements 284 provide a graphical representation 286 of the additional targeted offer associated with the predetermined discount on landscaping products and services provided by the landscaping company having the relationship with the first financial institution within a single display screen or window, or across multiple display screens or windows, of notification interface 272. For example, may, when presented within notification interface 272, graphical representation 286 may identify the predetermined discount of 25% and present the additional targeted offer in real-time and contemporaneously with the presentation of graphical representation 274, and prompt user 101 to obtain information associated with the landscaping products or services provided by the landscaping company in real-time and contemporaneously with the approval or rejection of the requested, real-time payment of $2,000.00 to the second financial institution, e.g., based on input provided to input unit 109B of client device 102 that selects a an "LEARN MORE" icon 286A presented within notification interface 272.

For example, upon viewing graphical representation 286, user 101 may elect to obtain the information associated with the landscaping products or services provided by the landscaping company, and may provide input to client device 102 (e.g., via input unit 109B) that selects "LEARN MORE" icon 286A presented within notification interface 272. Based on the selection of icon 286A, input unit 109B may route corresponding elements of input data indicative of the selection of "LEARN MORE" icon 286A to executed mobile banking application 108, which may perform operations (not illustrated in FIG. 2C), that access available incentive data 252 and that obtain the URL associated with the additional targeted offer and the landscaping company. In some instances, not illustrated in FIG. 2C, executed mobile banking application 108 may perform operations that trigger programmatically one or more additional application programs maintained within memory 106, such as the web browser described herein, and that provision the obtained URL to the executed web browser, which may cause display unit 109A to present portions of the web page associated with the additional targeted offer and the landscaping company.

Figure 3:
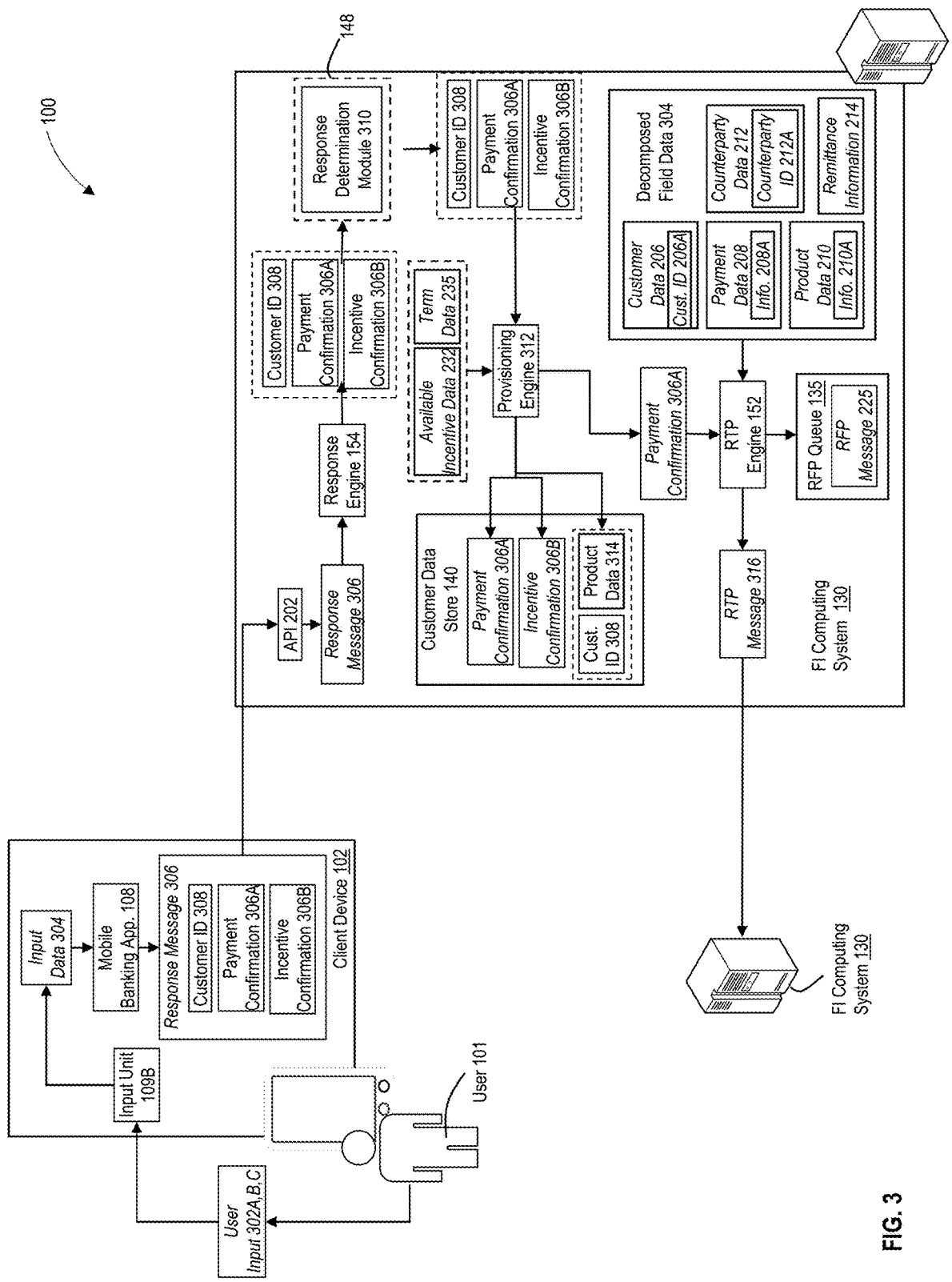

In some instances, and based on graphical representation 274 of the request for the $2,000.00 payment amount for the monthly mortgage payment requested from user 101 by the second financial institution (e.g., "Bank Claude"), and on graphical representation 278 of the targeted offer to provision the mortgage insurance available to user 101 in accordance with the determined terms and conditions, user 101 may elect to approved the requested, $2,000.00 payment and to accept the targeted offer to provision the available mortgage insurance in accordance with the determined terms and conditions. Referring to FIG. 3, user 101 may provide, via input unit 109B, input 302A that approves the requested $2,000.00 payment to the second financial institution and selects "APPROVE" icon 274A within notification interface 272, and input 302C that accepts the targeted offer to provision the available mortgage insurance and selects "ACCEPT" icon 278A within notification interface 272. Input unit 109B may, for example, receive user input 302A and 302B, and generate input data 304 characterizing user 101's selections. Input unit 109B may route input data 304 to executed mobile banking application 108, which may perform operations that generate a response message 306 that includes, among other things, a payment confirmation 306A indicating of the approval of the requested, $2,000.00 payment by user 101, an incentive confirmation 306B indicating the acceptance of the targeted offer to provision the available mortgage insurance in accordance with the determined terms and conditions, and a customer identifier 308 of user 101 (e.g., an alphanumeric login credential that uniquely identifies user 101 at FI computing system 130, etc.) into a corresponding portion of a response message 306. Executed mobile banking application 108 may also perform operations that transmit response message 306 across network 120 to FI computing system 130.

API 202 may, for example, receive response message 306 from client device 102, and may route response message 306 to a response engine 154 executed by the one or more processors of FI computing system 130. In some instances, one or more portions of response message 306 may be encrypted (e.g., using a public cryptographic key associated with FI computing system 130), and executed response engine 154 may perform operations that access a corresponding decryption key maintained within the one or more tangible, non-transitory memories of FI computing system 130 (e.g., a private cryptographic key associated with FI computing system 130), and that decrypt the encrypted portions of response message 306 using the corresponding decryption key. Further, executed response engine 154 may also perform operations that process response message 306 and obtain payment confirmation 306A, incentive confirmation 306B, and customer identifier 308, and may store the customer identifier 308, which uniquely identifies user 101, payment confirmation 306A indicative of the approval of the $2,000.00 payment requested by the second financial institution by user 101, and incentive confirmation 306B indicating the acceptance of the targeted offer to provision the available mortgage insurance in accordance with the determined terms and conditions by user 101, in a corresponding portion of data repository 134, e.g., within customer data store 140.

Further, executed response engine 154 may also provide payment confirmation 306A, incentive confirmation 306B, and customer identifier 308 as inputs to a response determination module 310 of executed analytical engine 148, which may process payment confirmation 306A and incentive confirmation 306B and determine that user 101 approved the requested, $2,000.00 payment and determine that user 101 accepted the targeted offer to provision the available mortgage insurance. Based on the determination that user 101 approved the requested, $2,000.00 payment and that user 101 accepted the targeted offer to provision the available mortgage insurance, executed provisioning engine 312 may provide payment confirmation 306A, incentive confirmation 306B, and customer identifier 308 as inputs to a provisioning engine 312 executed by the one or more processors of FI computing system 130 (e.g., based on a programmatic comment generated by executed provisioning engine 312).

Based on incentive confirmation 306B, executed provisioning engine 312 may access element 240 of targeted incentive data 238, and based available incentive data 232 and term data 235, executed provisioning engine 312 may perform operations that complete a qualification or underwriting process associated with the available mortgage insurance and provision the mortgage insurance to user 101 in accordance with the terms and conditions set forth in term data 235, that generate elements of product data 314 that identify and characterize the provisioned mortgage insurance, and that store product data 314 within customer data store 140, e.g., in conjunction with customer identifier 308.

Further, as illustrated in FIG. 3, executed provisioning engine 312 may route payment confirmation 306A, which indicates the approval of the requested $2,000 payment by user 101, to RTP engine 152 executed by the one or more processors of FI computing system 130 (e.g., based on a programmatic comment generated by executed provisioning engine 312). Executed RTP engine 152 may receive payment confirmation 306A, and may perform operations that access data repository 134, and obtain decomposed field data 204 that includes one or more elements of customer data 206, payment data 208, product data 210, counterparty data 212, and remittance information 214 extracted from the structured or unstructured message fields of RFP message 225 and, as such, that characterize the $2,000.00 payment requested by from user 101 by the second financial institution. Executed RTP engine 152 may perform operations (not illustrated in FIG. 3) that debit the approved $2,000 payment from the account of user 101 issued by the first financial institution and selected by user 101 to fund the payment (e.g., as specified within portions of payment data 208). Further, executed RTP engine 152 may perform operations that, based on the one or more elements of customer data 206, payment data 208, product data 210, counterparty data 212, and remittance information 214, generate an additional RTP message 316 that responds to RFP message 225 and that confirms the approved $2,000 payment by user 101 and the debiting of the $2,000 from the selected account of user 101.

For example, RTP message 316 may include message fields consistent with the ISO 20022 standard for electronic data exchange between financial institutions, and each of the message fields may be populated with data structured and formatted in accordance with the ISO 20022 standard. In some instances, executed RTP engine 152 may perform operations to parse customer data 206 within decomposed field data 204 to obtain the customer identifier 206A of user 101 and that parse payment data 208 to obtain payment information 208A that identifies the payment amount and a counterparty account (e.g., the account of second financial institution available to receive the payment). Executed RTP engine 152 may perform operations to populate RTP message 316 with the information that includes, but is not limited to, obtained customer identifier 206A, the payment amount and the counterparty account in accordance with field mapping data 138A. As illustrated in FIG. 3, executed RTP engine 152 may perform operations that cause FI computing system 130 to transmit RTP message 316 across network 120 to FI computing system 170 of the second financial institution, either directly or through one or more computing systems associated with a clearinghouse. Executed RTP engine 152 may also perform operations that access RFP message 225 maintained within RFP message queue 135, and delete RFP message 225 from RFP message queue 135.

Figure 4A:
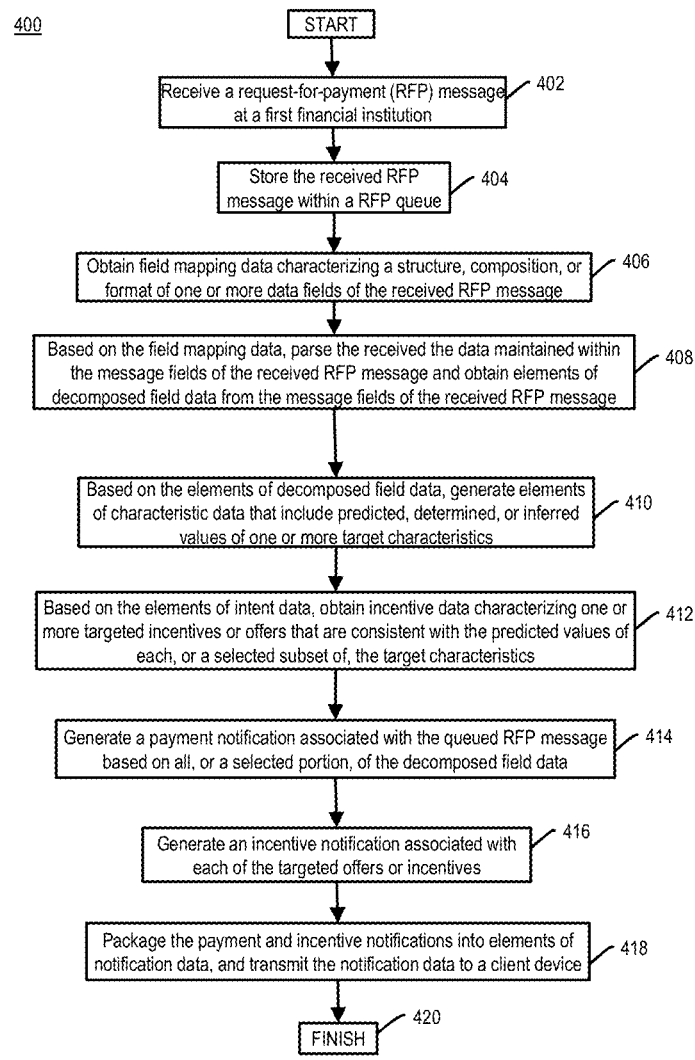
FIGS. 4A, 4B, and 4C are flowcharts of exemplary processes for provisioning targeted digital content in real-time based on a request-for-payment (RFP) message formatted and structured in accordance with one or more standardized data-exchange protocols, in accordance with some exemplary embodiments.
Figure 4B:
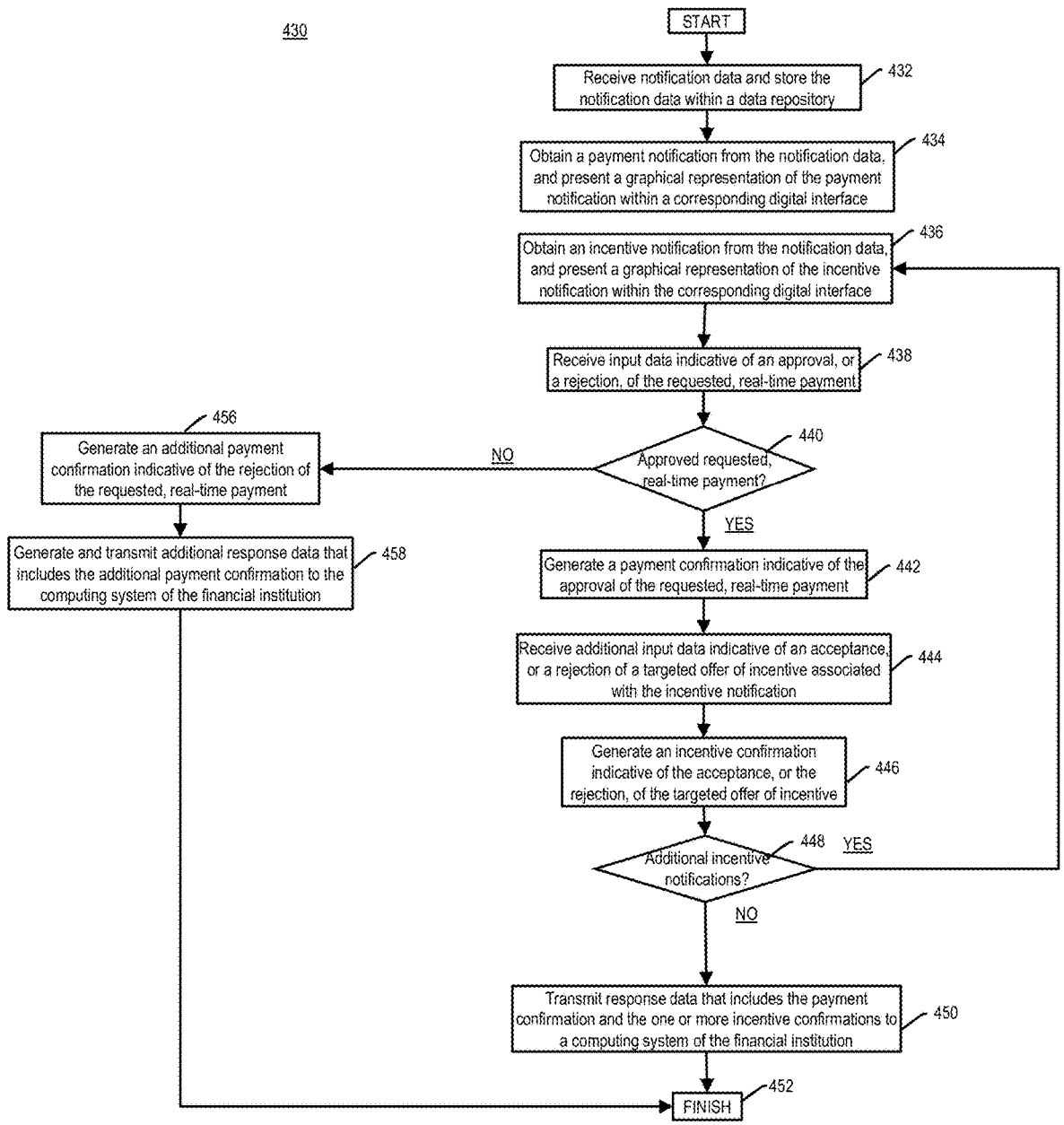
Figure 4C:
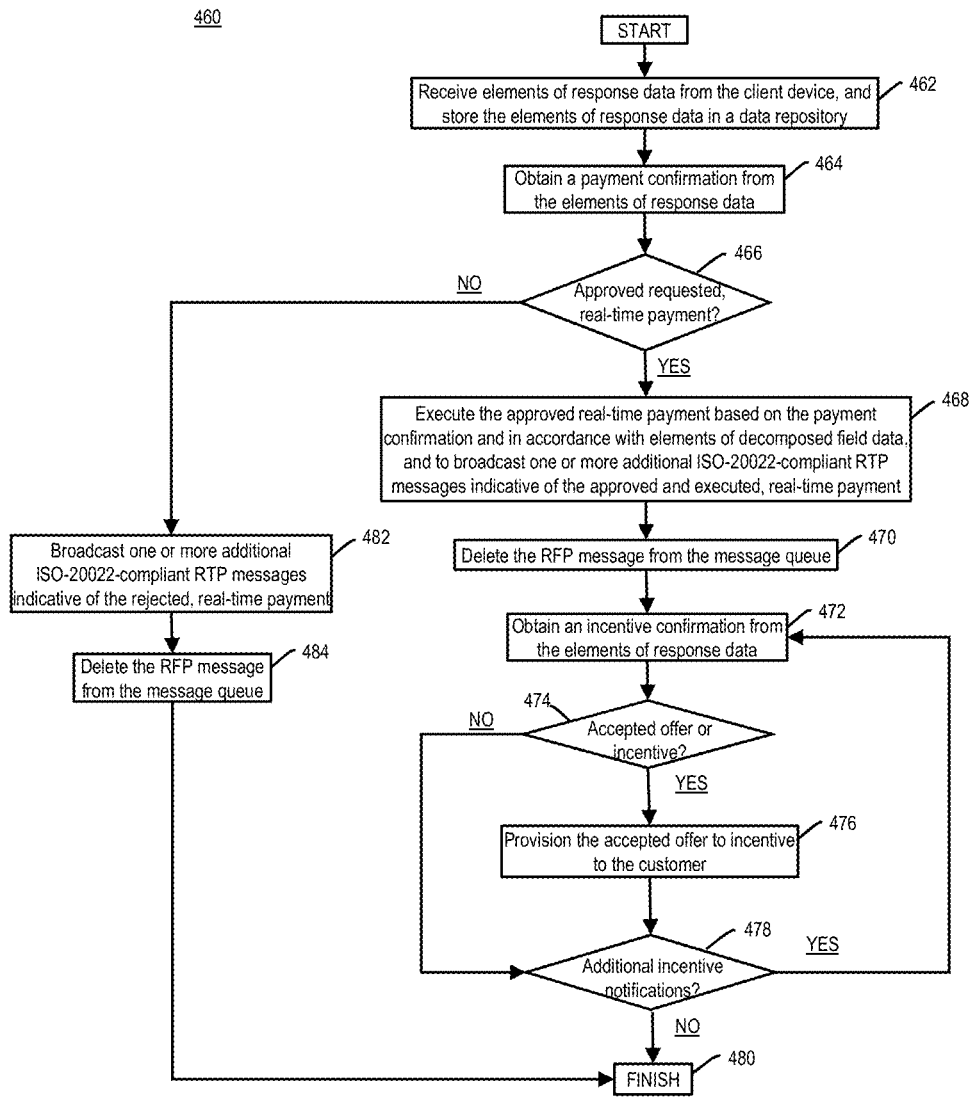

FIGS. 4A, 4B, and 4C are flowcharts of exemplary processes for provisioning targeted digital content in real-time based on a request-for-payment (RFP) message formatted and structured in accordance with one or more standardized data-exchange protocols. For example, one or more computing systems associated with a financial institution, such as FI computing system 130, may perform one or more of the steps of exemplary process 400, as described below in reference to FIG. 4A, and one or more of the steps of exemplary process 460, as described below in reference to FIG. 4C. Further, a computing device associated with, or operable by, user 101, such as client device 102, may perform one or more of the steps of exemplary process 430, as described below in reference to FIG. 4B.

Referring to FIG. 4A, FI computing system 130 may receive an RFP message having message fields structured in accordance with the ISO 20022 standard (e.g., in step 402 of FIG. 4A), and may store the received RFP message within a message queue maintained locally by the first financial institution computing system (e.g., in step 404 of FIG. 4A). In some instances, the first financial institution computing system may maintain the received RFP message within the message queue until the customer provides input accepting or rejecting the requested monthly payment, or alternatively, until an expiration of a corresponding period of temporal validity.

As described herein, a customer of the first financial institution, such as user 101, may hold a loan product (e.g., a home mortgage, an auto loan, etc.) issued by a second financial institution (e.g., based on operations performed by FI computing system 130), and the structured message fields of the RFP message may be populated with elements of data that identify and characterize a scheduled payment (e.g., monthly payment) on that loan product requested from the customer by the second financial institution. For example, the data within the structured or unstructured message fields of the ISO-20002-compliant RFP message may include, but is not limited to, elements of information that identify the customer, that identify the second financial institution, and that identify and characterize the requested monthly payment and the loan product, such as, but not limited to, the exemplary elements of information described herein. Further, the ISO-20022-compliant RFP message may also include one or more structured or unstructured data fields populated with a link (e.g., a short-form or tiny URL, a long-form URL, etc.) to remittance data associated with the requested payment, such as a link to a PDF or HTML bill or payment stub that includes any of the information described herein that identifies the financial institution requesting payment, the requesting payment, or the loan product.

Responsive to the receipt of the RFP message, FI computing system 130 may access mapping data that identifies and characterizes each of the messages fields within the ISO-20022-compliant RFP message (e.g., in step 406 of FIG. 4A). Based on the mapping data, FI computing system 130 may perform any of the exemplary processes described herein to parse and analyze all or a selected subset of the message fields of the RFP message to extract, obtain, or derive discrete elements of decomposed field data that identify and characterize the customer, the second financial institution requesting the monthly payment, the requested monthly payment, and additionally, or alternatively, the loan product associated with the monthly payment (e.g., in step 408 of FIG. 4A). FI computing system 130 may perform additional operations, described herein, that store the extracted, obtained, or derived elements of decomposed field data (e.g., that identify and characterize the customer, the second financial institution, the requested monthly payment, and/or the loan product) within an accessible data repository.

By way of example, FI computing system 130 may perform operations in step 408 that extract at least a subset of the data identifying and characterizing the customer, the second financial institution, the requested monthly payment, and the loan product from the structured or unstructured messages fields of the received RFP message. Examples of the extracted data may include, but are not limited to, the name of the customer, the name of the second financial institution, a payment amount and requested payment date of the requested monthly payment, or information identifying the loan product, such as those portions of the requested payment amount allocated to the escrow account, the principal amount, and the accrued interest.

In other instances, also in step 408, FI computing system 130 may perform any to the exemplary processes described herein to detect, within one or more of the message fields, a link to the remittance data associated with the requested monthly payment (e.g., a link to a PDF or HTML bill or payment stub that includes any of the information described herein that identifies the second financial institution requesting payment, the requested monthly payment, or the loan product). By way of example, the link may correspond to a long-form uniform resource locator (URL) into which certain elements of data may be embedded, such as, but not limited to, a unique identifier of the customer, and FI computing system 130 may perform operations, described herein, that parse the long URL to identify and extract the embedded data.

Additionally, or alternatively, FI computing system 130 may perform any of the exemplary processes described herein that, based on the detected link (e.g., the long-form URL described above, or a shortened URL, such as a tiny URL), programmatically access the remittance data associated with the processed link, e.g., as maintained at an external computing system. The remittance data may include a PDF or HTML bill associated with the requested monthly payment, and the FI computing system may perform operations that process the remittance data (e.g., through an application of an optical character recognition (OCR) process to the PDF bill, parsing code associated with the HTML bill, applying a screen-scraping technology to the bill) to extract the additional or alternate elements of the data that identifies and characterizes the customer, the second financial institution, the requested monthly payment, and/or the loan product. For instance, and based on the processed remittance data, the FI computing system may obtain elements of product data that, among other things, identifies: the type of loan product; the term, interest rate, and principal amount associated with the loan product; a current payoff amount associated with the loan product; and/or those portions of the requested payment amount allocated to the escrow account, the principal amount, and/or the accrued interest.

By way of example, in step 408, FI computing system 130 may extract, obtain, or derive, based on data within the populated message fields of the RFP message, customer data that includes the name of the customer (e.g., "Jane A. Doe") and payment data that includes, but is not limited to, the name of the second financial institution, the payment amount of the requested monthly payment (e.g., $2,000), and the requested payment date (e.g., "Jan. 15, 2022"), and those portions of the payment amount allocated to the escrow account (e.g., $500), to pay down the principal amount (e.g., $1,300), and to pay down the accrued interest (e.g., $200). Further, and using any of the processes described herein, FI computing system 130 may also extract, obtain, or derive additional elements of product data that identify and characterize the loan product, such as, but not limited to, the type of loan product (e.g., a home mortgage), the interest rate of the loan product (e.g., 3.8% APR), the principal amount of the loan product (e.g., $270,000), and a current payoff amount associated with the loan product (e.g., $268,700). The FI computing system may then perform operations that store the customer data, the payment data, and the product data within corresponding portions of the locally accessible data repository, e.g., as decomposed field data associated with the RFP message.

Based on the elements of decomposed field data, FI computing system 130 may perform any of the exemplary processes described herein to generate elements of characteristic data that include, among other things, predicted, determined, or inferred values of one or more target characteristics of a customer associated with the RFP message, a relationship between each the customer and the first financial institution, and further, a relationship between the customer and the loan product issued by the second financial institution, or one or more assets that secure the issued loan product (e.g., in step 410 of FIG. 4A). Further, and based on the generated elements of characteristic data, FI computing system 130 may also perform any of the exemplary processes described herein to generate elements of incentive data characterizing one or more targeted incentives or offers that are consistent with the predicted values of each, or a selected subset of, the target characteristics of the customer, the relationship between the customer and the first financial institution, and the relationship between the customer and the loan product or the one or more assets (e.g., in step 412 of FIG. 4A).

In some instances, FI computing system 130 may perform any of the exemplary processes described herein to generate one or more elements of a payment notification associated with the queued RFP message based on all, or a selected portion, of the decomposed field data (e.g., in step 414 of FIG. 4A). By way of example, and as described herein, the payment notification may be associated with the requested payment, and that payment notification may include, among other things, the full name of user 101, the requested payment amount and payment date, information identifying a customer account that funds the requested payment, and information identifying the second financial institution. Further, the payment notification may also include digital content that, when presented on a digital interface generated by an application program executed at client device 102 (e.g., mobile banking application 108 of FIG. 1, etc.), prompt user 101 to provide input to client device 102 that approves, or alternatively, declines, the real-time payment requested from user 101 by the second financial institution.

Further, and as illustrated in FIG. 4A, FI computing system 130 may also perform any of the exemplary processes described herein to generate one or more elements of an incentive notification associated with each of the targeted offers or incentives (e.g., in step 416 of FIG. 4A). By way of example, for a particular one of the targeted offers or incentives, the corresponding incentive notification may include, but is not limited to, information that identifies and characterizes the particular targeted offer or incentive (e.g., corresponding elements of incentive data, etc.) and digital content that, when presented on a digital interface generated by an application program executed at client device 102 (e.g., mobile banking application 108 of FIG. 1, etc.), prompt user 101 to provide input to client device 102 that accepts, or alternatively, declines, the particular targeted offer or incentive in real-time and contemporaneously within the initiation of the purchase transaction.

FI computing system 130 may also perform any of the exemplary processes described herein to package the generated payment notification and the one or more incentive notification into corresponding portions of notification data, and to transmit the elements of notification data across network 120 to client device 102 (e.g., in step 418 of FIG. 4A). In some instances, client device 102 may receive the elements of notification data, and an application program executed by the one or more processors of client device 102 (e.g., executed mobile banking application 108) may perform any of the exemplary processes described herein to present, within a corresponding digital interface, a graphical representation of the payment notification that prompts user 101 to approve, or reject, the real-time payment requested by merchant 111, and to present, within the corresponding digital interface, a graphical representation of one or more of the targeted offers or incentives that are consistent with the customer intent of the initiated purchase transaction. Exemplary process 400 is then complete in step 422 of FIG. 4A.

Referring to FIG. 4B, client device 102 may perform any of the exemplary processes described herein to receive the elements of notification data from FI computing system 130, and store the elements of notification data within a portion of a tangible, non-transitory memory accessible to client device 102 (e.g., in step 432 of FIG. 4B). Client device 102 may also perform any of the exemplary processes described herein to obtain the payment notification from the received elements of notification data, and generate, and render for presentation within a corresponding digital interface, a graphical representation of the payment notification that prompts user 101 to approve, or alternatively, reject, the real-time payment requested from user 101 by the second financial institution (e.g., in step 434 of FIG. 4B). Client device 102 may also perform any of the exemplary processes described herein to obtain one of the incentive notification from the received elements of notification data, and generate, and render for presentation within a corresponding digital interface, a graphical representation of the obtained incentive notification that prompts user 101 to accept, or alternatively, reject, the corresponding one of the targeted offers or incentives (e.g., in step 436 of FIG. 4B).

Further, client device 102 may also receive, via input unit 109B, elements of user input indicative of an approval, or alternatively, a rejection, of the requested, real-time payment by user 101 (e.g., in step 438 of FIG. 4B), and based on the elements of user input, client device 102 may determine whether user 101 approved, or rejected, the requested real-time payment (e.g., in step 440 of FIG. 4B). If, for example, client device 102 were to determine that user 101 approved the requested, real-time payment (e.g., step 540; YES), client device 102 may perform any of the exemplary processes described herein to process the elements of input data and generate a payment confirmation indicative of the approval, by user 101, of the requested real-time payment (e.g., in step 442 of FIG. 4B). Client device 102 may also receive, via input unit 109B, additional elements of user input indicative of an acceptance, or a rejection, of the corresponding one of the targeted offers or incentives (e.g., in step 444 of FIG. 4B), and client device 102 may perform any of the exemplary processes described herein to process the additional elements of input data and generate an incentive confirmation indicative of the acceptance, or rejection, of the corresponding one of the targeted offers or incentives (e.g., in step 446 of FIG. 4B).

Client device 102 may also perform operations that parse the received notification data and determine whether the notification data includes additional incentive notifications awaiting presentation (e.g., in step 448 of FIG. 4B). If, for example, client device 102 were to determine that the notification data includes additional incentive notifications awaiting processing (e.g., step 548; YES), exemplary process 500 may pass back to step 436, and client device 102 may perform any of the exemplary processes described herein to obtain an additional one of the incentive notification from the received elements of notification data, and generate, and render for presentation within the corresponding digital interface, a graphical representation of the obtained additional incentive notification.

Alternatively, if client device 102 were to determine that the notification data includes no further incentive notifications (e.g., step 448; NO), client device 102 may also perform any of the exemplary processes described herein to generate elements of response data that include the payment and incentive confirmations, and to transmit the elements of response data across network 120 to FI computing system 130 (e.g., in step 450 of FIG. 4B). Exemplary process 430 is then complete in step 452.

Further, and referring back to step 540, if client device 102 were to determine that user 101 rejected the requested, real-time payment (e.g., step 540; NO), client device 102 may perform any of the exemplary processes described herein to generate an additional payment confirmation indicating the rejection of the requested, real-time payment by user 101 (e.g., in step 456 of FIG. 4B), and to generate elements of additional response data that include the additional payment confirmation in conjunction with the identifier of user 101 and/or merchant 111 (e.g., in step 458 of FIG. 4B). Client device 102 may also transmit the elements of additional response data across network 120 to FI computing system 130 (e.g., also in step 458 of FIG. 4B). Exemplary process 430 is then complete in step 452.

Referring to FIG. 4C, FI computing system 130 may receive the elements of response data from client device 102, and may store the received elements of response data within one or more tangible, non-transitory memories accessible to FI computing system 130, such as in conjunction with the elements of decomposed field data within data repository 134 (e.g., in step 462 of FIG. 4C). FI computing system 130 may also perform any of the exemplary processes described herein to obtain, from the elements of response data, the payment confirmation indicative of the approval, or alternatively, the rejection, of the real-time payment request from user 101 by merchant 111 (e.g., in step 564 of FIG. 5C), and to process the payment confirmation and to determine whether user 101 approved, or rejected, the real-time payment (e.g., in step 466 of FIG. 4C).

If, for example, FI computing system 130 were to determine that user 101 approved the requested, real-time payment (e.g., step 466; YES), FI computing system 130 may perform any of the exemplary processes described herein to execute the now-approved real-time payment based on the payment confirmation and in accordance with the elements of decomposed field data (e.g., in step 468 of FIG. 4C). By way of example, in step 468, FI computing system 130 may perform any of the exemplary processes described herein to obtain the identifier of user 101 from the elements of response data, to access the elements of decomposed field data, and based on the identifier of user 101, to obtain account data that identifies the payment instrument held by user 101 and capable of funding the real-time payment and a payment amount of the real-time payment. FI computing system 130 may also perform operations in step 468 that, in real-time, debit the payment amount from the account associated with the payment instrument, and transmit one or more additional ISO-20022-compliant RTP messages that confirm the approval of the requested, real-time payment by user 101 and the real-time debiting of the payment amount from the account associated with the payment instrument. FI computing system 130 may also perform operations that access the RFP message maintained within RFP message queue 135, and delete the RFP message from RFP message queue 135 (e.g., in step 470 of FIG. 4C).

FI computing system 130 may also perform operations that obtain, from the elements of response data, one of the incentive confirmation indicative of the approval, or alternatively, the rejection, of a corresponding one of the targeted offers or incentives by user 101 (e.g., in step 472 of FIG. 4C), and that process the obtained incentive confirmation and determine whether user 101 approved, or rejected, the corresponding one of the targeted offers or incentives (e.g., in step 474 of FIG. 4C). If FI computing system 130 were to determine that user 101 accepted the corresponding one of the targeted offers or incentives (e.g., step 474; YES), FI computing system 130 may perform any of the exemplary processes described to provision the corresponding one of the targeted offers or incentives to user 101 (e.g., in step 476 of FIG. 4C).

FI computing system 130 may also perform operations that parse the received response data and determine whether the response data includes additional incentive confirmation awaiting provisioning (e.g., in step 478 of FIG. 4C). If, for example, FI computing system were to determine that the response data includes additional incentive confirmation awaiting provisioning (e.g., step 478; YES), exemplary process 400 may pass back to step 472, FI computing system 130 may also perform operations that obtain, from the elements of response data, an additional one of the incentive confirmation indicative of the approval, or alternatively, the rejection, of an additional one of the targeted offers or incentives by user 101. Alternatively, if FI computing system were to determine that the response data includes no additional incentive confirmations (e.g., step 478; NO), exemplary process 460 may be complete in step 480.

Referring back to step 474, If FI computing system 130 were to determine that user 101 rejected the corresponding one of the targeted offers or incentives (e.g., step 474; NO), exemplary process 560 may pass to step 478, and FI computing system 130 may perform operations that parse the received response data and determine whether the response data includes additional incentive confirmation awaiting provisioning.

Further, and referring back to step 466, if FI computing system 130 were to determine that user 101 rejected the requested, real-time payment (e.g., step 466; NO), FI computing system 130 may perform any of the exemplary processes described herein to broadcast one or more additional ISO-20022-compliant RTP messages that confirm the rejection of the requested, real-time payment by user 101 (e.g., in step 482 of FIG. 4C). FI computing system 130 may also perform operations that access the RFP message maintained within RFP message queue 135, and delete the RFP message from RFP message queue 135 (e.g., in step 484 of FIG. 4C). Exemplary process 560 may be complete in step 480.

C. Exemplary Computing Architectures

Examples of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as mobile banking application 108, decomposition engine 146, analytical engine 148, notification engine 150, real-time payment (RTP) engine 152, response engine 154, application programming interfaces (APIs) 202, 264 remittance analysis engine 216, characteristic prediction module 222, incentive determination module 228, extraction module 266, interface element generation module 268, response determination module 310, and provisioning engine 312 can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" (e.g., the FI computing system and the customer device described herein) refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user (e.g., the customer or employee described herein), embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus comprising:
a communications interface;
a memory storing instructions; and
at least one processor coupled to the communications interface and to the memory, the at least one processor being configured to execute the instructions to:
receive, via the communications interface across a first communications channel, a message comprising elements of message data disposed within corresponding message fields, the message data characterizing a real-time exchange of data requested by a first counterparty from a second counterparty, the real-time data exchange being associated with a first product provisioned to the second counterparty by the first counterparty, and the first communications channel being established between the apparatus and a computing system associated with the first counterparty;
based on mapping data associated with the message fields, perform operations that obtain at least a subset of the elements of message data from corresponding ones of the message fields, the subset of the elements of message data comprising a first identifier of the first counterparty and a second identifier of the second counterparty;
based on the first and second identifiers, obtain first data characterizing prior exchanges of data associated with the second counterparty and second data identifying a target parameter that characterizes at least one of the second counterparty or a relationship between the second counterparty and the first counterparty;
based on an application of a trained machine-learning or artificial-intelligence process to an input dataset that includes at least the subset of the elements of message data, a portion of the first data, and a portion of the second data, determine a value of the target parameter that characterizes at least one of the second counterparty or the relationship between the second counterparty and the first counterparty, and obtain digital content associated with a second product or a service based on the target parameter value; and
transmit, via the communications interface across a second communications channel, notification data to a device operable by the second counterparty, the notification data comprising the digital content and additional digital content associated with the real-time data exchange, the second communications channel being established between the apparatus and an application program executed by the device, and the notification data causing the executed application program to present a portion of each of the digital content and the additional digital content within a digital interface.

2. The apparatus of claim 1, wherein the at least one processor is further configured to execute the instructions to:
obtain, from the memory, the mapping data associated with the message fields;
perform operations that obtain the elements of message data from corresponding ones of the message fields based on the mapping data; and
store the elements of message data within the memory, the elements of message data comprising the first identifier of the first counterparty, the second identifier of the second counterparty, information associated with the real-time data exchange, and first product data associated with the first product.

3. The apparatus of claim 2, wherein:
the received message is structured in accordance with a standardized data-exchange protocol; and
elements of the mapping data identify corresponding ones of the elements of message data and corresponding ones of the message fields.

4. The apparatus of claim 2, wherein the at least one processor is further configured to execute the instructions to obtain, based on the mapping data, remittance information from one or more of the message fields, the remittance information comprising a uniform resource locator associated with elements of formatted data maintained by a computing system.

5. The apparatus of claim 4, wherein the at least one processor is further configured to execute the instructions to, based on the uniform resource locator, perform operations that request and receive the elements of the formatted data from the computing system via the communications interface.

6. The apparatus of claim 5, wherein the at least one processor is further configured to execute the instructions to process the elements of formatted data, and obtain at least one of the first identifier, the second identifier, a portion of the information associated with the real-time data exchange, or a portion of the first product data from the processed elements of formatted data.

7. The apparatus of claim 1, wherein:
the second product or a service is available to the second counterparty; and
the at least one processor is further configured to execute the instructions to:
obtain one or more elements of second product data that characterize the available second product or service; and
perform operations that obtain the digital content associated with the second product or service based on a determination that the elements of second product data are consistent with the target parameter value.

8. The apparatus of claim 7, wherein the at least one processor is further configured to execute the instructions to:
receive, via the communications interface, a response to the notification data from the device;
based on the response, perform operations that provision the second product or service to the second counterparty; and
store data associated with the provisioned second product or service within the memory.

9. The apparatus of claim 7, wherein the notification data comprises the one or more elements of second product data and the digital content, the one or more elements of product data comprising at least one of a product identifier associated with the second product or a uniform resource locator associated with the second product.

10. The apparatus of claim 7, wherein the at least one processor is further configured to execute the instructions to determine a term or condition of the second product or service based on an application of a qualification process to the elements of message data, the notification data comprising the one or more elements of product data, the determined term or condition, and the digital content.

11. The apparatus of claim 1, wherein:
the portion of the second data comprises target data that characterizes the target parameter; and
the at least one processor is further configured to execute the instructions to:
obtain the target data from the memory; and
generate the input dataset, the input dataset comprising at least the subset of the elements of message data, the portion of the first data, and the target data;
perform operations that apply trained machine learning process to the input dataset, and based on the application of trained machine learning process to the input dataset, determine the value of the target parameter or a range of values of the target parameter; and
obtain the digital content associated with the second product or service based on the target parameter value or on the range of the target parameter values.

12. The apparatus of claim 1, wherein:
the elements of message data comprise a uniform resource locator associated with structured data maintained by the computing system;
the at least one processor is further configured to execute the instructions to:
perform operations, based on the uniform resource locator, that request and receive at least a portion of the structured data from the computing system via the communications interface, and that obtain at least one additional parameter value from the portion of the structured data;
generate the input dataset, the input dataset comprising at least the subset of the elements of message data, the portion of the first data, the portion of the second data, and the at least one additional parameter value; and
determine the target parameter value based on the application of the trained machine learning process to the input dataset.

13. The apparatus of claim 1, wherein the at least one processor is wherein the at least one processor is further configured to execute the instructions to:
obtain, from the subset of the elements of message data, elements of geographic data characterizing a first geographic position associated with the second counterparty;
obtain, from the memory, additional data characterizing the second product or the service, and based on the additional data, determine a second geographic position associated with the second product or the service; and
determine that the second geographic position is disposed within a threshold distance of the first geographic position, and based on the determination that the second geographic position is disposed within the threshold distance of the first geographic position, obtain the digital content associated with the second product or the service from the memory and transmit the notification data to the device operable by the second counterparty across the second communications channel via the communications interface.

14. The apparatus of claim 1, wherein the at least one processor is further configured to execute the instructions to:
perform operations that train the machine-learning or artificial-intelligence process based on an application of the machine-learning or artificial-intelligence process to corresponding elements of training data and validation data and in accordance with elements of process parameter data, the elements of training data and validation data having a composition consistent with elements of process input data;
based on an output of the application of the machine-learning or artificial-intelligence process to the corresponding elements of training data and validation data, compute a value of one or more metrics characterizing a performance or accuracy of the machine-learning or artificial-intelligence process; and
determine that the computed value of the one or more metrics is consistent with at least one threshold criterion, and based on the determination that the computed value of the one or more metrics is consistent with the at least one threshold criterion, store the process input data and the process parameter data within a portion of the memory.

15. The apparatus of claim 14, wherein the at least one processor is further configured to execute the instructions to:
determine that the computed value of the one or more metrics is inconsistent with at least one threshold criterion; and
based on the determined inconsistency, modify a portion of at least one of the process input data and the process parameter data.

16. A computer-implemented method comprising:
receiving, across a first communications channel, and using at least one processor, a message comprising elements of message data disposed within corresponding message fields, the message data characterizing a real-time exchange of data requested by a first counterparty from a second counterparty, the real-time data exchange being associated with a first product provisioned to the second counterparty by the first counterparty, and the first communications channel being established between the apparatus and a computing system associated with the first counterparty;

based on mapping data associated with the message fields, performing operations, using the at least one processor, that obtain at least a subset of the elements of message data from corresponding ones of the message fields, the subset of the elements of message data comprising a first identifier of the first counterparty and a second identifier of the second counterparty;

based on the first and second identifiers, obtaining, using the at least one processor, first data characterizing prior exchanges of data associated with the second counterparty and second data identifying a target parameter that characterizes at least one of the second counterparty or a relationship between the second counterparty and the first counterparty;

based on an application of a trained machine-learning or artificial-intelligence process to an input dataset that includes at least the subset of the elements of message data, a portion of the first data, and a portion of the second data, determining, using the at least one processor, a value of the target parameter that characterizes at least one of the second counterparty or the relationship between the second counterparty and the first counterparty, and obtaining, using the at least one processor, digital content associated with a second product or a service based on the target parameter value; and transmitting, across a second communications channel, and using the at least one processor, notification data to a device operable by the second counterparty, the notification data comprising the digital content and additional digital content associated with the real-time data exchange, the second communications channel being established between the apparatus and an application program executed by the device, and the notification data causing the executed application program to present a portion of each of the digital content and the additional digital content within a digital interface.

17. The computer-implemented method of claim 16, further comprising:
obtaining, using the at least one processor, the mapping data associated with the message fields of the message;
performing operations using the at least one processor, that obtain the elements of message data from corresponding ones of the message fields based on the mapping data; and
storing the elements of message data within a data repository using the at least one processor, the elements of message data comprising the first identifier of the first counterparty, the second identifier of the second counterparty, information associated with the real-time data exchange, and product information associated with the first product.

18. The computer-implemented method of claim 17, wherein:
the received message is structured in accordance with a standardized data-exchange protocol; and elements of the mapping data identify corresponding ones of the elements of message data and corresponding ones of the message fields.

19. The computer-implemented method of claim 17, further comprising:
based on the mapping data, and using the at least one processor, obtaining remittance information from one or more of the message fields, the remittance information comprising a uniform resource locator associated with elements of formatted data maintained by a computing system;
based on the uniform resource locator, performing operations, using the at least one processor, that request and receive the elements of the formatted data from the computing system; and
obtaining, using the at least one processor, at least one of the first identifier, the second identifier, a portion of the information associated with the real-time data exchange, or a portion of the product information from the processed elements of formatted data.

20. The computer-implemented method of claim 16, wherein:
the digital content is associated with a second product or a service available to the second counterparty; and
the computer-implemented method further comprises:
obtaining, using the at least one processor, one or more elements of product data that characterize the available second product or service; and
performing operations, using the at least one processor, that obtain the digital content associated with the second product or service based on a determination that the one or more elements of the product data are consistent with the parameter value.

21. The computer-implemented method of claim 20, further comprising:
receiving, using the at least one processor, a response to the notification data from the device; and
based on the response, performing operations, using the at least one processor, that provision the second product or service to the second counterparty; and
using the at least one processor, storing data associated with the provisioned second product or service within a data repository.

22. A tangible, non-transitory computer-readable medium storing instructions that, when executed by at least one processor, cause the at least one processor to perform a method, comprising:
receiving, across a first communications channel, a message comprising elements of message data disposed within corresponding message fields, the message data characterizing a real-time exchange of data requested by a first counterparty from a second counterparty, the real-time data exchange being associated with a first product provisioned to the second counterparty by the first counterparty, and the first communications channel being established between the apparatus and a computing system associated with the first counterparty;
based on mapping data associated with the message fields, performing operations that obtain at least a subset of the elements of message data from corresponding ones of the message fields, the subset of the elements of message data comprising a first identifier of the first counterparty and a second identifier of the second counterparty;
based on the first and second identifiers, obtaining first data characterizing prior exchanges of data associated with the second counterparty and second data identifying a target parameter that characterizes at least one of the second counterparty or a relationship between the second counterparty and the first counterparty;

based on an application of a trained machine-learning or artificial-intelligence process to an input dataset that includes at least the subset of the elements of message data, a portion of the first data, and a portion of the second data, determining a value of the target parameter that characterizes at least one of the second counterparty or a relationship between the second counterparty and the first counterparty, and obtaining digital content associated with a second product or a service based on the target parameter value; and transmitting, across a second communications channel, notification data to a device operable by the second counterparty, the notification data comprising the digital content and additional digital content associated with the real-time data exchange, the second communications channel being established between the apparatus and an application program executed by the device, and the notification data causing the executed application program to present a portion of each of the digital content and the additional digital content within a digital interface.

* * * * *